US010885611B2

(12) United States Patent
Treibitz et al.

(10) Patent No.: US 10,885,611 B2
(45) Date of Patent: Jan. 5, 2021

(54) IMAGE DEHAZING AND RESTORATION

(71) Applicants: CARMEL HAIFA UNIVERSITY ECONOMIC CORPORATION LTD., Haifa (IL); RAMOT AT TEL-AVIV UNIVERSITY LTD., Tel Aviv (IL)

(72) Inventors: Avital Treibitz, Beer Yaacov (IL); Dana Berman, Yehud (IL); Shai Avidan, Ra'anana (IL)

(73) Assignees: CARMEL HAIFA UNIVERSITY ECONOMIC CORPORATION LTD., Haifa (IL); RAMOT AT TEL-AVIV UNIVERSITY LTD., Tel Aviv (IL)

(*) Notice: Subject to any disclaimer, the term of this patent is extended or adjusted under 35 U.S.C. 154(b) by 206 days.

(21) Appl. No.: 16/092,053

(22) PCT Filed: Apr. 6, 2017

(86) PCT No.: PCT/IL2017/050426
§ 371 (c)(1),
(2) Date: Oct. 8, 2018

(87) PCT Pub. No.: WO2017/175231
PCT Pub. Date: Oct. 12, 2017

(65) Prior Publication Data
US 2019/0114747 A1 Apr. 18, 2019

Related U.S. Application Data

(60) Provisional application No. 62/319,338, filed on Apr. 7, 2016.

(51) Int. Cl.
*G06K 9/00* (2006.01)
*G06T 5/00* (2006.01)
(Continued)

(52) U.S. Cl.
CPC .......... *G06T 5/003* (2013.01); *G06F 16/9027* (2019.01); *G06K 9/6215* (2013.01);
(Continued)

(58) Field of Classification Search
CPC combination set(s) only.
See application file for complete search history.

(56) References Cited

U.S. PATENT DOCUMENTS 6,687,414 B1    2/2004  Edgar
2008/0123942 A1*  5/2008  Bezryadin ............. H04N 19/60
                                                     382/162

(Continued)

FOREIGN PATENT DOCUMENTS

CN    104504658 A      4/2015
WO    2015125146 A1    8/2015
WO    2015192115 A1    12/2015

OTHER PUBLICATIONS

Tang, Investigating Haze-relevant Features in a Learning Framework for Image Dehazing, 2014, IEEE (Year: 2014).*
(Continued)

*Primary Examiner* — Alex Kok S Liew
(74) *Attorney, Agent, or Firm* — The Roy Gross Law Firm, LLC; Roy Gross

(57) ABSTRACT

Methods for dehazing a digital image and for restoring an underwater digital image. The methods include the following steps: First, clustering pixels of a digital image into haze-lines, wherein each of the haze-lines is comprised of a sub-group of the pixels that are scattered non-locally over the digital image. Second, estimating, based on the haze-lines, a transmission map of the digital image, wherein the transmission map encodes scene depth information for each
(Continued)

(a) Haze-free image (b) Corresponding clusters (c) Synthetic hazy image (d) Corresponding haze-lines pixel of the digital image. Then, for a hazy image, calculating a dehazed digital image based on the transmission map.

18 Claims, 29 Drawing Sheets

(51) Int. Cl.
    *G06T 7/90* (2017.01)
    *G06F 16/901* (2019.01)
    *G06K 9/62* (2006.01)
(52) U.S. Cl.
    CPC ...... *G06T 7/90* (2017.01); *G06T 2207/10024* (2013.01); *G06T 2207/20061* (2013.01)

(56) References Cited

U.S. PATENT DOCUMENTS

2010/0067823 A1   3/2010  Kopf et al.
2010/0259651 A1* 10/2010  Fattal ..................... G06T 5/003
                                                                  348/241

OTHER PUBLICATIONS

Berman et al., Non-Local Image Dehazing, IEEE Conference on Computer Vision and Pattern Recognition, pp. 1674-1682, 2016.
Emberton et al., "Hierarchical rank-based veiling light estimation for underwater dehazing", Proceedings of the British Machine Vision Conference (BMVC), pp. 125.1-125.12, 2015.
Akkaynak et al., "Use of commercial off-the-shelf digital cameras for scientific data acquisition and scene-specific color calibration" J Opt Soc Am A Opt Image Sci Vis., Feb. 1, 2014, p. 312-321, vol. 31, No. 2.
Ancuti et al., "Single Image Dehazing by Multi-Scale Fusion", IEEE Transactions on Image Processing, vol. 22, No. 8, p. 3271-3282, Aug. 2013.
Austin et al., "Spectral dependence of the diffuse attenuation coefficient of light in ocean waters", Optical Engineering, vol. 25 No. 3, p. 471-479, Mar. 1986.
Bahat et al., "Blind Dehazing Using Internal Patch Recurrence", 2016 IEEE International Conference on Computational Photography (ICCP), 2016.
Bryson et al., "Colour-Consistent Structure-from-Motion Models using Underwater Imagery", Robotics: Science and Systems, Citeseer, p. 1-8, 2012.
Carlevaris-Bianco et al., "Initial Results in Underwater Single Image Dehazing", Oceans 2010 MTS/IEEE Seattle, p. 1-8, 2010.
Chiang et al., "Underwater Image Enhancement by Wavelength Compensation and Dehazing", IEEE Transactions on Image Processing, vol. 21, No. 4, p. 1756-1769, 2012.
Dehazing using Color-Lines, http://www.cs.huji.ac.il/~raananf/projects/dehaze_cl/results/, retrieved Oct. 8, 2018.
Dollar et al., "Structured Forests for Fast Edge Detection", 2013 IEEE International Conference on Computer Vision, p. 1841-1848, 2013.
Drews et al., "Transmission Estimation in Underwater Single Images", 2013 IEEE International Conference on Computer Vision Workshops, p. 825-830, 2013.

Fattal, "Single Image Dehazing", ACM Transactions on Graphics, vol. 27, No. 3, Article 72, Aug. 2008.
Fattal, "Dehazing using color-lines", ACM Transactions on Graphics, vol. 34, No. 1, Article 13, Nov. 2014.
Gibson et al, "An analysis of single image defogging methods using a color ellipsoid framework", EURASIP Journal on Image and Video Processing, 2013(1), 2013.
He et al., "Single Image Haze Removal Using Dark Channel Prior", Proc. IEEE CVPR, 2009.
He et al., "Single Image Haze Removal Using Dark Channel Prior", IEEE Transactions on Pattern Analysis and Machine Intelligence, vol. 33, No. 12, 2011.
Jiang et al., "What is the space of spectral sensitivity functions for digital color cameras?" 2013 IEEE Workshop Applications of Computer Vision (WACV). 2013, p. 168-179.
Lu et al., "Underwater Image Enhancement Using Guided Trigonometric Bilateral Filter and Fast Automatic Color Correction" 2013 20th IEEE International Conference on Image Processing, Sep. 2013, p. 3412-3416.
Luzon-Gonzalez et al., "Recovering of weather degraded images based on RGB response ratio constancy", Appl. Opt., Feb. 1, 2015, Vo. 54, No. 4.
Marsaglia, "Choosing a point from the surface of a sphere", The Annals of Mathematical Statistics, vol. 43, No. 2, p. 645-646, 1972.
Narasimhan et al., "Chromatic framework for vision in bad weather", Proc. IEEE CVPR, 2000.
Nishino et al., "Bayesian Defogging", Int. Journal of Computer Vision (IJCV), vol. 98, No. 3, p. 263-278, 2012.
Orchard et al., "Color Quantization of Images", IEEE Transactions on Signal Processing, vol. 39, No. 12, p. 2677-2690, Dec. 1991.
Peng et al., "Single underwater image enhancement using depth estimation based on blurriness" Image Processing (ICIP), 2015 IEEE International Conference on. (2015), p. 4952-4956.
Scharstein et al., "A Taxonomy and Evaluation of Dense Two-Frame Stereo Correspondence Algorithms", International Journal of Computer vision 47(1-3): p. 7-42, 2002.
Schechner et al., "Instant Dehazing of Images Using Polarization", Proc. IEEE CVPR, 2001, p. 325-332.
Schechner et al., "Recovery of underwater visibility and structure by polarization analysis" IEEE J. Oceanic Engineering 30(3) (2005) 570-587.
Sulami et al., "Automatic recovery of the atmospheric light in hazy images" In Proc. IEEE ICCP, 2014.
Sumner, "Processing raw images in matlab", https://users.soe.ucsc.edu/ rcsumner/rawguide/RAWguide.pdf (2014).
Tan, "Visibility in Bad Weather from a Single Image", Proc. IEEE CVPR, 2008, p. 1-8.
Tang et al., "Investigating haze-relevant features in a learning framework for image dehazing", Proc. IEEE CVPR, 2014, p. 2995-3002.
Tarel et al., "Fast visibility restoration from a single color or gray level image", Computer Vision, 2009 IEEE 12th International Conference on, pp. 2201-2208, Sep. 2009.
The Berkeley Segmentation Dataset and Benchmark, https://www2.eecs.berkeley.edu/Research/Projects/CS/vision/grouping/segbench/, retrieved Oct. 8, 2018.
International Search Report PCT/IL2017/050426 Completed Jul. 30, 2017; dated Aug. 1, 2017 4 pages.
Written Opinion of the International Searching Authority PCT/IL2017/050426 dated Aug. 1, 2017 6 pages.

* cited by examiner

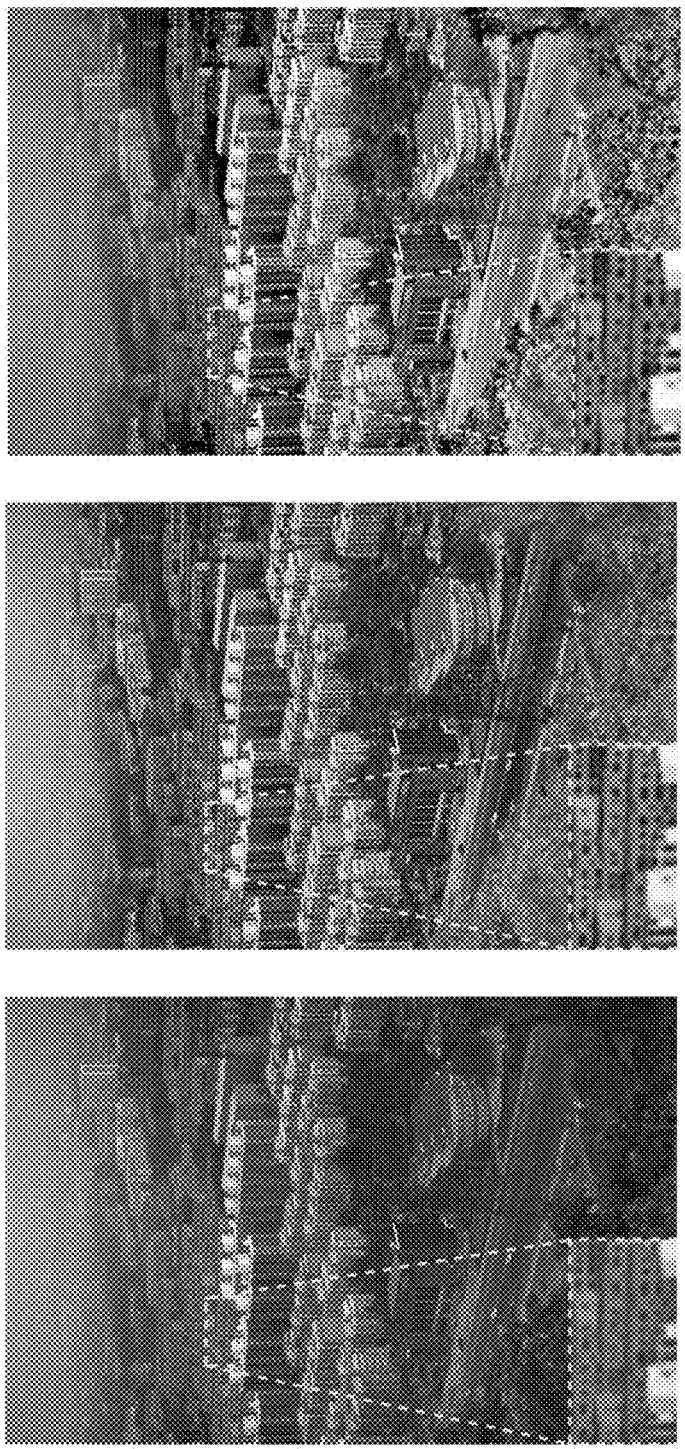
Fig. 7c(ii)

Fig. 8a HAZY IMAGE: FOREST

HE ET AL.
TRANSMITTION MAP

HE ET AL.
DEHAZED IMAGE

FATTAL ET AL.
TRANSMITTION MAP

FATTAL ET AL.
DEHAZED IMAGE

Fig. 13c Incorrect $\beta_{BR}=0.11, \beta_{BG}=0.46$ $\cos(\theta)=0.96$

Fig. 13b Correct $\beta_{BR}=0.65, \beta_{BG}=1.12$ $\cos(\theta)=0.99$

ORIGINAL IMAGE

VEILING LIGHT ESTIMATION 21A  21B 21C  21D

IMAGE DEHAZING AND RESTORATION

CROSS-REFERENCE TO RELATED APPLICATIONS

This application is a National Phase of PCT Patent Application No. PCT/IL2017/050426 having International filing date of Apr. 6, 2017, which claims the benefit of priority of U.S. Provisional Patent Application No. 61,319,338, filed on Apr. 7, 2016, entitled "Image Dehazing and Restoration". The contents of the above applications are all incorporated by reference as if fully set forth herein in their entirety.

BACKGROUND

The invention relates to the field of digital image processing.

Outdoor digital images often suffer from low contrast and limited visibility due to haze, fog, or other atmospheric phenomena. As used herein, the term image means a digital image as collected by a digital camera sensor from photons emitted by a physical scene, and stored on a non-transitory computer-readable storage medium. The digital image comprises pixel, where each pixel has three or more color channel values. Haze, for example, results from small particles in the air that scatter the light in the atmosphere. Fog results from tiny water droplets suspended in the air near the earth's surface. Haze and fog are independent of scene radiance and have two effects on the acquired image: they attenuate the signal of the viewed scene, and introduce an additive component to the image, termed the ambient light, or airlight (the color of a scene point at infinity). As used herein the term airlight means a set of values representing color, such as the red, green, and blue color channel values, that represent the color of the haze in the images where no objects are visualized. The image degradation caused by haze or fog increases with the distance from the camera, since the scene radiance decreases and the airlight magnitude increases. Thus, hazy or foggy images may be modeled as a per-pixel convex combination of a haze/fog-free image and the global airlight.

Images taken in media other than air may suffer from similar degradation. In addition, some media, such as water, is characterized by wavelength-dependent transmission, distorting the colors in the resulting image. Compensating for this wavelength-dependent transmission may require applying different attenuation coefficients for different color channels in the image. This is sometimes done with underwater imagery.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a method for dehazing a digital image, comprising: operating at least one hardware processor to: cluster pixels of a digital image into haze-lines, wherein each of the haze-lines is comprised of a sub-group of the pixels that are scattered non-locally over the digital image; estimate, based on the haze-lines, a transmission map of the digital image, wherein the transmission map encodes scene depth information for each pixel of the digital image; and calculate a dehazed digital image based on the transmission map.

Another embodiment provides a method for restoring a digital image, comprising: operating at least one hardware processor to: convert a digital image of an underwater scene to a plurality of medium-compensated images that are each based on attenuation coefficient ratios of a different water type; and for each of the plurality of medium-compensated images: (a) cluster pixels of the medium-compensated image into haze-lines, wherein each of the haze-lines is comprised of a sub-group of the pixels that are scattered non-locally over the medium-compensated image, (b) estimate, based on the haze-lines, a transmission map of the medium-compensated image, wherein the transmission map encodes scene depth information for each pixel of the medium-compensated image, and (c) calculate, based on the transmission map and the attenuation coefficient ratios, a restored digital image of the underwater scene.

In some embodiments, the clustering of pixels comprises: representing colors of the pixels of the digital image in a spherical coordinate system whose origin is an estimated global airlight value; uniformly sampling the unit sphere of the representation, to output a plurality of color samples each associated with one of the pixels of the digital image; grouping the color samples based on their $\theta$ (Theta) and $\varphi$ (Phi) angles in the spherical coordinate system, according to a mutual closest point on the unit sphere, thereby producing multiple groups each being one of the haze-lines.

In some embodiments, the clustering of pixels comprises representing the color differences between the pixels of the digital image and the airlight value on a pre-computed tessellation of the unit sphere, where the pre-computed tessellation is uniformly sampled and stored in Cartesian coordinates in a KD-tree. The clustering of pixels comprises searching for nearest neighbors on the KD-tree using Euclidean distance coordinates. The clustering of pixels comprises grouping the color samples based on the nearest neighbors, thereby producing multiple groups each being one of the haze-lines.

In some embodiments, the estimating of the transmission map comprises: estimating an initial transmission map as the quotient, for each individual pixel of the pixels of the digital image, of: (a) a distance of the individual pixel from an airlight value, and (b) a distance from a pixel which is farthest away from the airlight value and belong to the same haze-line as the individual pixel; regularizing the initial transmission map by enforcing a smoothness of the digital image on the initial transmission.

In some embodiments, the estimating of the transmission map comprises: estimating an initial transmission map as the quotient, for each individual pixel of the pixels of the digital image, of: (a) a distance of the individual pixel from an veiling-light value, and (b) a distance from a pixel which is farthest away from the veiling-light value and belong to the same haze-line as the individual pixel; regularizing the initial transmission map by enforcing a smoothness of the digital image on the initial transmission.

In some embodiments, the method further comprises operating said at least one hardware processor to: for each of the restored digital images: (a) perform global white balancing of the restored digital image, to output a white-balanced image, (b) calculate a standard deviation of a red channel of the white-balanced image and of a green channel of the white-balanced image; and output the white-balanced image having the lowest standard deviation.

In some embodiments, the method further comprises computing the estimated global veiling-light value by: generating an edge map of the digital image; thresholding the edge map, to produce multiple pixel blobs; and determining that a color or an average color of pixels making up a largest one of the multiple pixel blobs, is the global veiling-light value.

Another embodiment provides a system that comprises: an image sensor configured to acquire the digital image of any one of the embodiments listed above; a non-transitory computer-readable storage medium having stored thereon program instructions to perform the steps of any one of the embodiments listed above; and at least one hardware processor configured to execute the program instructions.

A further embodiment provides a computer program product comprising a non-transitory computer-readable storage medium having program code embodied therewith, the program code executable by at least one hardware processor to perform the steps of any one of the embodiments listed above.

Another embodiment provides a method for estimating a set of airlight color channel values for a digital image. The method comprising operating at least one hardware processor to automatically perform the method actions. The method comprising an action of receiving a digital image comprising a plurality of pixels, each pixel comprising at least three color channel values. The method comprising for each of the plurality of pixels, an action of assigning, based on the color channel values, a Hough transform vote for each of the plurality of pixels to at least one of a plurality of candidate airlight color channel value sets, each of the sets comprising at least three airlight color channel values. The method comprising, based on the assigned votes, an action of selecting one of the sets as the airlight color channel value set of the digital image.

In some embodiments, each pixel color channel value and each airlight color channel value is one of a red channel value, a green channel value, and a blue channel value.

In some embodiments, the assigning comprises computing for each pixel a plurality of distances, in a color channel value space, between each pixel and a plurality of candidate haze-lines, wherein each of the plurality of candidate haze-lines is defined by (a) one of the plurality of candidate airlight color channel value sets and (b) one of a plurality of solid angles. The assigning comprises comparing the plurality of distances with an adaptive threshold, wherein the adaptive threshold is based on the distance from each pixel to the respective one of the plurality of candidate airlight color channel value sets. The assigning comprises, for each pixel, assigning at least one vote to some of the plurality of candidate airlight color channel value sets based on the comparison.

In some embodiments, for each Hough transform vote, the at least one of the plurality of candidate airlight color channel value sets that is voted for, is brighter than the voting pixel.

In some embodiments, the method further comprises selecting, for each pixel, a a plurality of subsets, each subset a unique combination of at least two color channel values, thereby producing at least three limited color channel datasets. The method further comprises performing the steps of assigning and selecting for each of the at least three limited color channel datasets, producing at least three selected airlight color channel value sets. The method further comprises combining the at least three selected airlight color channel values to produce a single airlight color channel value set.

In some embodiments, the method further comprises grouping the plurality of pixel color values into a plurality of clusters, wherein the vote is assigned for each of the plurality of clusters.

In some embodiments, the plurality of clusters are grouped by at least one of a k-means algorithm and a Minimum Variance Quantization algorithm.

In some embodiments, the assigned vote for each of the plurality of clusters is weighted by a statistical parameter of each respective cluster.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 8a-8d show a comparison of transmission maps and dehazed images of the present dehazing technique versus previous methods;

FIGS. 13a-13c demonstrate the importance of water type matching;

DETAILED DESCRIPTION

Figure 1:
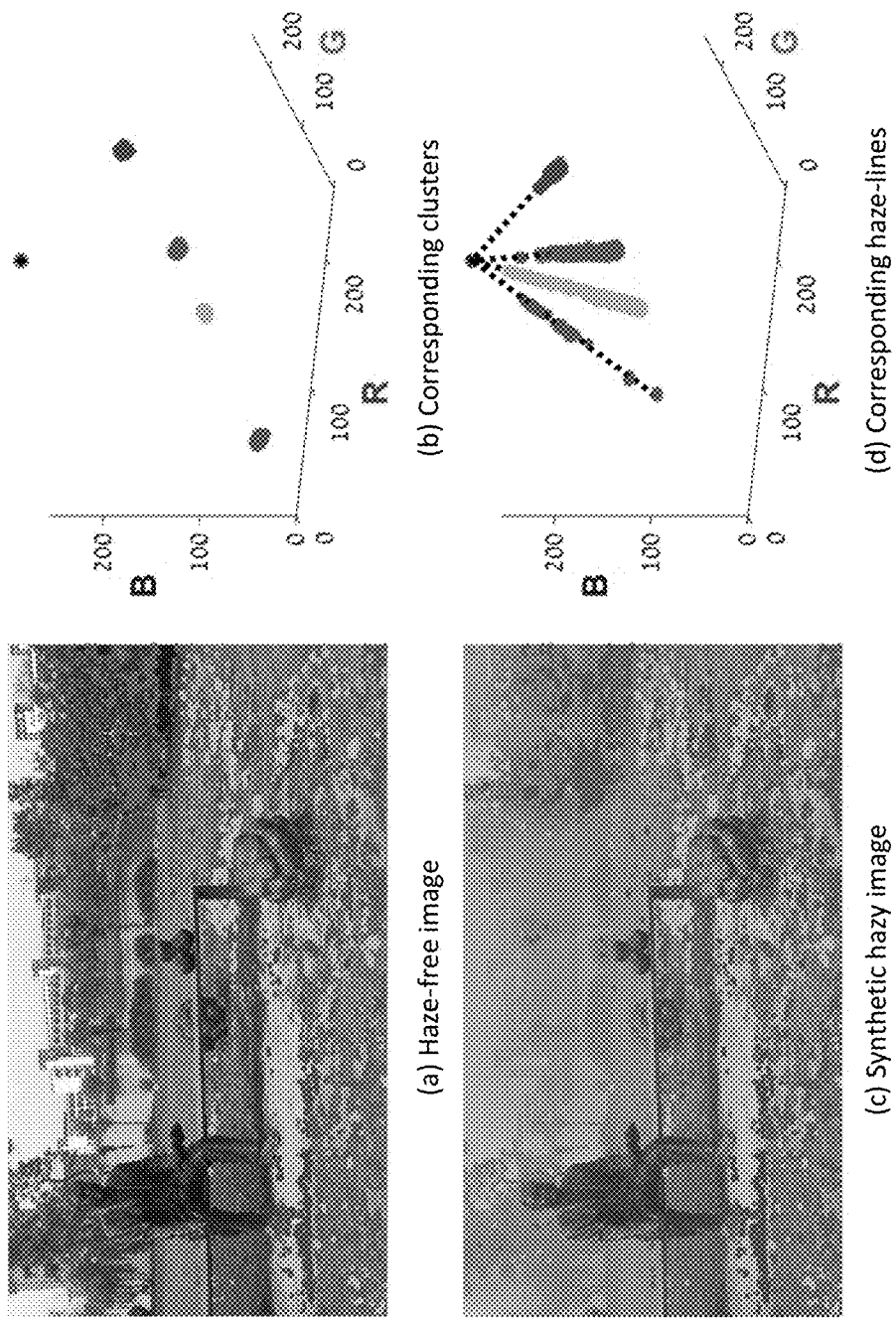
FIG. 1 illustrates the haze-lines prior.

Disclosed herein is single-image dehazing technique that operates globally on a hazy image without having to divide the image into patches. The technique relies on the assumption that colors of a haze-free image are well approximated by a few hundred distinct colors, that form tight clusters in red-green-blue (RGB) space, such as a three values where each represents the intensity of that color channel. A key observation of the present application is that pixels in a given cluster are often non-local, i.e., they are spread over the entire image plane and are located at different distances from the camera. In the presence of haze, these varying distances translate to different transmission coefficients. Therefore, each color cluster in the hazy image becomes a shape (such as a line, arc, curve, and/or the like ie combination) in RGB space, that is termed here a "haze-line". For example, the RGB values of the cluster pixels are substantially along a line (such as substantially colinear) extending through the airlight (or veiling-light) RGB value. Optionally, the correlation coefficient between a model shape and the pixel color values may be used to determine the haze-line. Optionally, the haze line model may be loosely (i.e. elastically) associated with the airlight point, rigidly associated with the airlight point (i.e. constrained fitting), and/or the like. Using these haze-lines, the present technique recovers both the distance map and the haze-free image. The technique is linear in the size of the image, deterministic, and requires no training. It performs well on a wide variety of images and is competitive with other state-of-the-art methods.

Also disclosed is an adaptation of the single-image dehazing technique which makes it suitable for scenes characterized by wavelength-dependent transmission, such as under water. The adapted technique takes into account the different attenuation coefficient for the different color channels, affected by the medium in which the imaging takes place.

Further disclosed are techniques for airlight RGB value determination from single images.

Image Dehazing

The disclosed technique aims to recover, out of a hazy image, the RGB values of a haze-free image. Another, optional, aim is to recover the transmission (the coefficient of the convex combination) for each pixel, which provides a precursor to the scene depth. These are ill-posed problems that have an under-determined system of three equations and at least four unknowns per pixel, with inherent ambiguity between haze and object radiance.

For simplicity of discussion, the present technique is referred to as "dehazing", and such terminology is used throughout the specification. However, the technique may also apply to foggy images, underwater images, and/or the like. For example, the atmospheric phenomena of haze and fog are similar in how they affect photographs. Accordingly, it is hereby intended that the term "haze", and any grammatical inflections thereof, is interpreted as relating to haze, fog, or any like image degradation due to light's reflection, refraction, scattering, absorption, dispersion, and/or the like.

The technique uses the observation that colors of a haze-free image may be well approximated by a few hundred distinct colors, as presented, for example, by M. T. Orchard and C. A. Bouman. Color quantization of images. *Signal Processing, IEEE Transactions* on, 39(12):2677-2690, 1991. This implies that pixels in a hazy image may be modeled by lines in RGB space that pass through the airlight coordinate. These lines are termed here haze-lines, to stress this characteristic. Pixels along a haze-line come from objects that have similar radiance colors, located over the entire image plane. These objects may be located at different distances from the camera. Since their acquired color may be modeled by a convex combination of the radiance color and the airlight color, such objects may span a line in RGB space. We use these lines to estimate the per-pixel transmission based on the pixel's position along the line it belongs to.

As opposed to recent state-of-the-art methods, the present technique is global and does not divide the image to patches. Patch-based methods take great care to avoid artifacts by either using multiple patch sizes or taking into consideration patch overlap and regularization using connections between distant pixels. In the present application, the pixels that form the haze-lines are spread across the entire image and therefore capture a global phenomena that is not limited to small image patches. Thus, our prior is more robust and significantly more efficient in run-time.

The present technique is an efficient algorithm that is linear in the size of the image. We automatically detect haze-lines and use them to dehaze the image. Also presented here are the results of extensive experiments conducted by the inventors to validate the technique and report quantitative and qualitative results on many outdoor images.

We first present the haze model and then describe how we use non-local haze-lines for image dehazing.

The common hazy image formation model, as discussed in W. E. K. Middleton. Vision through the atmosphere. Toronto: University of Toronto Press, 1952, is:

$$I(x)=t(x) \cdot J(x)+[1-t(x)] \cdot A, \qquad \text{Eq. (1)}$$

where x denotes the image coordinate, I denotes the observed hazy image RGB values at x, t(x) denotes the transmission at x, and J denotes the true RGB radiance of the scene point imaged at x. The airlight A denotes a single color (i.e. RGB values) representing the airlight in image areas where t=0. It should be emphasized that, although the term "airlight" implies that open air photography is involved, its concept is nonetheless applicable to underwater photography, where it may be termed "veiling light". In this disclosure, these terms may be used interchangably.

To estimate the veiling light, we assume an area without objects is visible in the image, in which the color of the pixels is determined by the veiling light alone. This is a reasonable assumption when the line of sight is horizontal. It does not hold when photographing a reef wall up close, or when the camera is pointed downwards. However, in these cases, the distance of objects from the camera usually varies less then in horizontal scenes, and a simple contrast stretch is likely to be sufficient.

Figure 17:
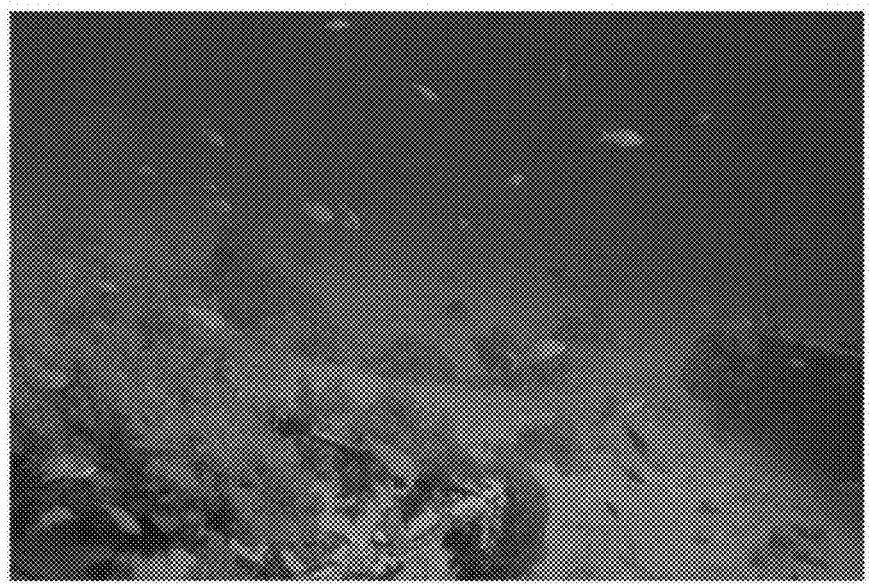
FIG. 17 shows an exemplary underwater image and a veiling light pixel blob computed for that image.
Figure 17:
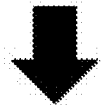
Figure 17:
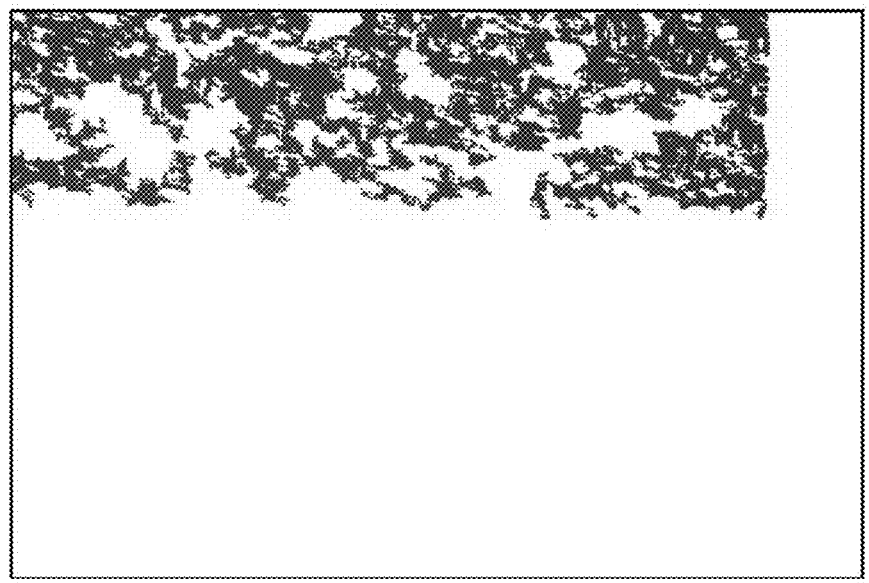

Optionally, in order to detect the pixels that belong to the veiling light, we generate an edge map of the image using an edge detection tool, such as, for example, the Structured Edge Detection Toolbox (P. Dollár and C. L. Zitnick. Structured forests for fast edge detection. In *Proc. IEEE ICCV,* 2013; available online at: https://github.com/pdollar/edges, last viewed Mar. 27, 2017) and threshold the edge map, to produce multiple connected components (i.e., multiple pixel blobs). We then look for and determine the largest connected component. The pixels belonging to the largest connected component are classified as veiling-light pixels (x∈VL). An example may be seen in FIG. 17, where the bottom frame shows only the veiling light pixels of the top image. The veiling-light A is the color of these pixels, or, when the thresholding yielded multiple colors, the average color of these pixels.

The scene transmission t(x) is distance-dependent:

$$t(x)=e^{-\beta d(x)} \quad \text{Eq. (2)}$$

where β denotes the attenuation coefficient of the atmosphere and d(x) denotes the distance of the scene at pixel x. Generally, β is wavelength dependent and therefore t is different per color channel, as discussed in S. G. Narasimhan and S. K. Nayar. Chromatic framework for vision in bad weather. In *Proc. IEEE CVPR*, 2000, and in Y. Y. Schechner, S. G. Narasimhan, and S. K. Nayar. Instant dehazing of images using polarization. In *Proc. IEEE CVPR*, 2001. This dependency has been assumed negligible in many previous single image dehazing methods, to reduce the number of unknowns. We follow this assumption. The transmission t(x) acts as the matting coefficient between the scene J and the airlight A. Thus, per-pixel x, Eq. (1) has three measurements I(x) and four unknowns: J(x) and t(x), resulting in an under-determined estimation problem.

The present technique, as briefly discussed above, is based on the observation that the number of distinct colors in an image is orders of magnitude smaller than the number of pixels, as presented, for example, by Orchard et al. (1999), Id. This assumption has been used extensively in the past and is used for saving color images using indexed colormaps. The present inventors have validated and quantifies it on the Berkeley Segmentation Dataset (BSDS300), available online at http://www.eecs.berkeley.edu/Research/Projects/CS/vision/grouping/segbench/, last viewed Apr. 2, 2016. This is a diverse dataset of clear outdoor natural images and thus represents the type of scenes that might be degraded by haze. We clustered the RGB pixel values of each image, such by using K-means clustering, a Minimum Variance Quantization clustering, and/or the like, to a maximum of 500 clusters, and replaced every pixel in the image with its respective cluster center. The result is an image with 500 different RGB values at most (two orders of magnitude smaller than image size). The PSNR (Peak Signal to Noise Ratio) of the images generated with the reduced color set, compared to the original ones, were high and ranged from 36.6 dB to 52.6 dB. A histogram of the obtained PSNR values is shown in FIG. 3, as well as the image that had the worst PSNR, before and after color quantization. This validates the haze-lines prior.

The observation regarding a small number of distinct colors holds for haze-free images. In the presence of haze, object points that belong to the same color cluster end up with different acquired colors since they are located in disparate image areas and thus have different distances from the camera. This prior suggests that pixels that are clustered together in a haze-free image form a line in RGB space in a hazy image. Based on Eq. (1), the two end points of the line are the original color J and the airlight A. These are the haze-lines.

This prior is demonstrated in FIG. 1. A haze-free image is clustered using K-means to 500 clusters. The pixels belonging to four of these clusters are marked by different color markers in FIG. 1a and their RGB coordinates are plotted in FIG. 1b, demonstrating tight clusters. Note that the clusters include pixels distributed over the entire image that come from objects with different distances from the camera. A synthetic hazy image was generated from the clear image (FIG. 1c) by the method used in R. Fattal. Dehazing using color-lines. *ACM Trans. Graph.*, 34(1):13, 2014. The same pixels as in FIG. 1a are marked. However, now, colors of pixels that belonged to the same color cluster are no longer similar. This is depicted in RGB space in FIG. 1d, where the color coordinates of these pixels are distributed along a haze-line spanned by the original color and the airlight. The pixels marked by purple circles (originating from the sand patch) are located in similar distances, so their distribution along the haze-line is rather tight. However, the pixels marked by orange triangles (grassy areas) are found at different locations in the real world, so they are distributed along the haze-line.

Figure 2A:
FIGS. 2a-2c show a comparison between haze-lines and color lines.
Figure 2C:
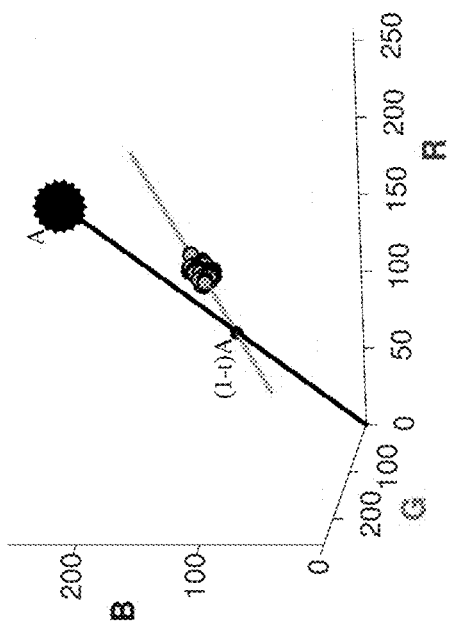
Figure 2B:
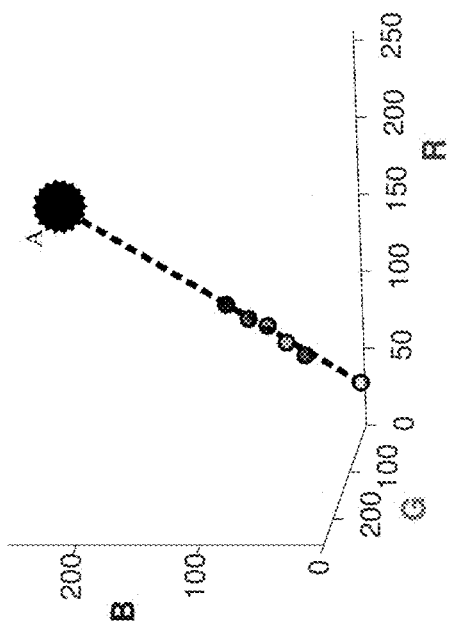
Figure 3B:
FIGS. 3a-3d illustrate a validation of the haze-lines prior.
Figure 3D:
Figure 3A:
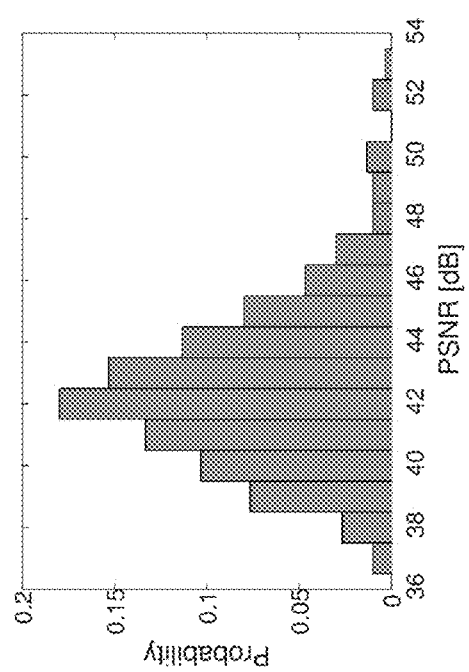
Figure 3C:

FIG. 2 demonstrates the haze-lines prior on a hazy outdoor image. Six different pixels identified by our method as belonging to the same haze line are circled. All of them are on shaded tree trunks and branches, and are likely to have similar radiance J. However, their observed intensity I is quite different, as shown in FIG. 2b, where these pixels form a haze-line in RGB space that passes through the airlight.

The present technique, in some embodiments thereof, is composed of three core steps: clustering the pixels into haze-lines, estimating a transmission map, and dehazing. Optionally, the estimation of the transmission map is divided into two: first, an estimation of an initial transmission map; second, a regularization step which yields a more accurate transmission map.

Color Spaces and Multi/Hyper-Spectral Images

Embodiments of the present technique uses an example of an RGB color channel input image. When a non-RGB input image is received (such as CMYK, YIQ, YUV, YDbDr, YPbPr, YCbCr, xvYCC, HSV, HSL, etc.), it may first be converted to RGB using techniques known in the art. Alternatively, the present technique may operate on any color space, with out without respective modifications. For example, the present technique may work directly on non-RGB color spaces with linear transformation to RGB space.

Optionally, equivalent embodiments maybe applied to any spectral image space, such as two color channel, three color channel, four color channel, and/or the like. The maximum number of color channels that an embodiment may automatically process is limited by the limitations of the physical processing hardware, and may include fields of applications that have other technical problems from those described herein, such as the image dehazing of images depicting a landscape, seascape, and/or the like. Therefore, the number of color channels of an image to be automatically processed by an embodiment may be a range between 2 and 15, 3 and 20, 4 and 10, 5 and 25, or any combination thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Optionally, embodiments may be implemented for different imaging modalities, such as different camera images, stereo camera images, photon sensor images, electromagnetic radiation images, particle images, and/or the like. The primary criterion for application to a modality is that the "haze-lines" can be modelled in the color space as an analytical shape (line, arc, parabola, etc.) and that the "airlight value can be used to remove the unwanted image characteristic.

Optionally, images may be in two dimensions, three dimensions, four dimensions, five dimension, and/or the like. For example, a two channel embodiment may use the techniques described herein to partially process the dehazing of an image, or otherwise remove unwanted image characteristics (i.e. glare, prismatic effects, and/or the like). For example, multispectral or hyperspectral images may by processed, such as remote sensing atmospheric images comprising 5 color channels (i.e. atmospheric infrared transparency windows) to remove cloud cover, hazing, glare, and/or the like. Such augmented images may better be used to compute sea surface temperature, vegetation indices, and/or the like. For example, dual-energy computed topography images may be processed using embodiments of the techniques to remove ghosting.

Specific Steps of Dehazing an Image

The first core step is finding the haze-lines. A may be estimated using conventional methods, such those in R. Fattal. Single image dehazing. *ACM Trans. Graph.*, 27(3): 72, 2008; K. He, J. Sun, and X. Tang. Single image haze removal using dark channel prior. In *Proc. IEEE CVPR*, 2009; and R. Tan. Visibility in bad weather from a single image. In *Proc. IEEE* CVPR, 2008.

Let us define $I_A$ as:

$$I_A(x) = I(x) - A,\qquad \text{Eq. (3)}$$

where the three-dimensional (3D) RGB coordinate system is translated such that the airlight is at the origin. Following Eq. (1), $$I_A(x) = t(x) \cdot [J(x) - A].\qquad \text{Eq. (4)}$$

We express $I_A(x)$ in spherical coordinates:

$$I_A(x) = [r(x), \theta(x), \phi(x)]\qquad \text{Eq. (5)}$$

Here r denotes the distance to the origin (i.e., $\|I - A\|$), $\theta$ and $\phi$ denote the longitude and latitude, respectively.

Figure 4:
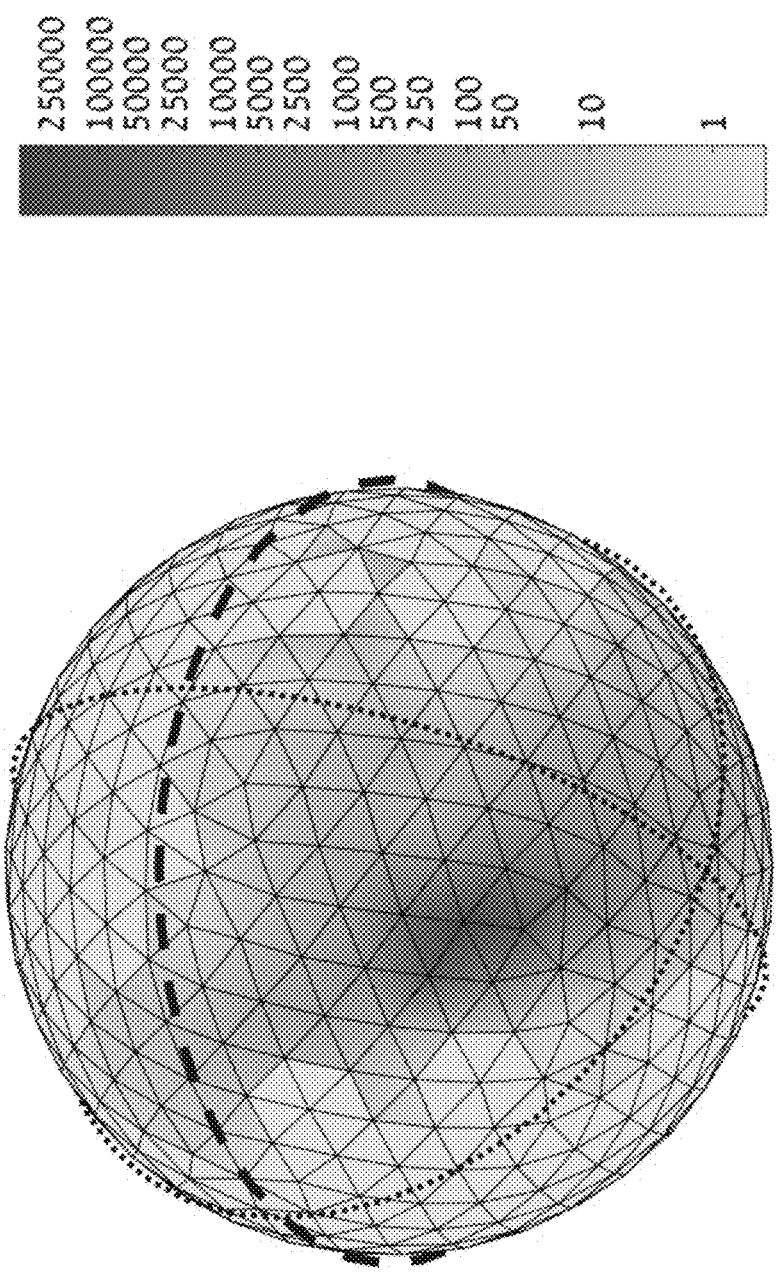
FIG. 4 shows an airlight-centered spherical representation.

The colors of the pixels are now represented in a spherical coordinate system around the airlight. FIG. 4 shows the histogram of the Forest image (FIG. 2*a*) projected onto a sphere. The sphere was sampled uniformly using 500 points. The color at each point $[\phi, \theta]$ indicates the number of pixels x with these angles when writing $I_A(x)$ in spherical coordinates (image size 768×1024 pixels). The equator ($\phi=0$) is marked by a bold dashed blue line, while the longitudes $$\theta = 0, \frac{\pi}{2}$$

are marked by dotted blue lines. The color-mapping is logarithmic for illustration purposes. The histogram indicates that the pixels are highly concentrated in terms of their longitude and latitude.

Let us look at Eq. (4). For given values of J and A, scene points at different distances from the camera differ only in the value of t. In the spherical coordinate system we defined, changes in t affect only r(x) without changing either $\phi(x)$ or $\theta(x)$. In other words, pixels x and y have similar RGB values in the underlying haze-free image when their $[\phi,\theta]$ are similar:

$$J(x) \approx J(y) \Rightarrow \{\phi(x) \approx \phi(y), \theta(x) \approx \theta(y)\}, \forall t.\qquad \text{Eq. (6)}$$

Therefore, pixels belong to the same haze-line when their $[\phi(x), \theta(x)]$ values are similar. Each point on the sphere in FIG. 4 represents a haze-line, in which all the pixels have approximately the same angles $[\phi(x), \theta(x)]$. The pixels in each haze-line have similar values in the non-hazy image J with high probability.

Note that there is inherent ambiguity between color and haze for colors which are collinear with the airlight:

$$J_1 - A = \alpha(J_2 - A) \Rightarrow J_1 = (1-\alpha)A + \alpha J_2,\qquad \text{Eq. (7)}$$

where $\alpha$ denotes a scale factor. In this case all single image dehazing methods may correct $J_1$ and $J_2$ to the same color. This is the only case in our method when two color clusters may be mapped to the same haze-line.

In order to determine which pixels are on the same haze-line, pixels should be grouped according to their angles $[\phi, \theta]$. A two-dimensional (2D) histogram binning of $\theta$ and $\phi$ with uniform edges in the range $[0, 2\pi] \times [0, \pi]$ may not generate a uniform sampling of a sphere. Instead, the samples may be denser near the poles, as observed by G. Marsaglia. Choosing a point from the surface of a sphere. *Ann. Math. Statist.*, 43(2):645-646, 04 1972, since the distance on the sphere is relative to $\sin(\theta)$. Therefore, we sample the unit sphere uniformly, as shown in FIG. 4, where each vertex is a sample point. Each vertex corresponds to a haze-line. For clarity of display, the number of samples in FIG. 1 is smaller than the actual number we use. We group the pixels based on their $[\phi(x), \theta(x)]$ values, according to the closest sample point on the surface to the airlight color channel values (i.e. the color differences between the RGB values of the pixels of the digital image and the airlight color values). This may be implemented efficiently by building a KD-Tree from the pre-defined tessellation and querying the tree for each pixel. This is much faster than running a clustering algorithm, such as K-means, Minimum Variance Quantization algorithm, or the like.

Figure 5B:
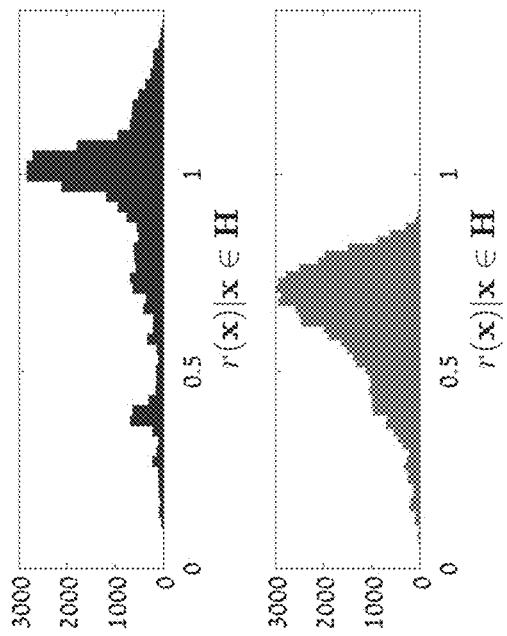
FIGS. 5a-5b show distance distribution per haze-line.
Figure 5A:

Based on the analysis of the prior described above, several hundreds of haze-lines represent an image with a good approximation. In some embodiment, the technique yields a range of between 10-50, 50-100, 100-200, 200-300, 300-400, 400-500, 500-600, 600-700, 700-800, 800-900, or more than 900 haze-lines—each of these ranges constituting a different embodiment. In some embodiments, the number of haze-lines is dependent on the amount of colors in the image; generally, a very colorful image would yield a large number of haze-lines (.e.g., above 400), while a relatively pale image would yield a lower number (e.g., below 50). For example, in one experiment, an image of haystacks, which included a relatively low number of colors, was well dehazed using as little as 20 haze-lines. FIG. 5*a* depicts the layout of two different haze-lines in the image plane for the Forest image. Pixels belonging to two different haze-lines are depicted in green and blue, respectively. FIG. 5*b* is a histogram of r(x) within each cluster. The horizontal axis is limited to the range $[0,\|A\|]$, as no pixel may have a radius outside that range in this particular image.

The second core step of the present technique is to estimate the transmission map. Optionally, this core step is broken into two. First, estimation of initial transmission: For a given haze-line defined by J and A, r(x) depends on object distance:

$$r(x)=t(x)\|J(x)-A\|, 0 \leq t(x) \leq 1.$$ Eq. (8)

Thus, t=1 corresponds to the largest radial coordinate:

$$r_{max} \stackrel{def}{=} \|J - A\|.$$ Eq. (9)

Combining Eqs. (8,9) results in an expression for the transmission based on radii in the haze-line:

$$t(x)=r(x)/r_{max}.$$ Eq. (10)

Now, the question is how to find an estimate $\hat{r}_{max}$ for the maximal radius? When a haze-line H contains a haze-free pixel, then $\hat{r}_{max}$ is the maximal radius of that haze-line:

$$\hat{r}_{max}(x) = \max_{x \in H}\{r(x)\},$$ Eq. (11)

where the estimation is done per haze-line H. FIG. 5b displays the radii histograms of the two clusters shown in FIG. 5a. We assume that the farthest pixel from the airlight is haze free, and that such a pixel exists for every haze-line. This assumption does not hold for all of the haze-lines in an image, however the regularization step partially compensates for it. Combining Eqs. (10,11) results in a per-pixel estimation of the transmission:

$$\tilde{t}(x)=r(x)/\hat{r}_{max}(x).$$ Eq. (12)

Following the estimation of the initial transmission, a regularization step may take place due to the following reason. The initial transmission is estimated using the haze-lines, without using any spatial information. As a result, nearby pixels that were clustered to different haze-lines might have significantly different transmission values, while in reality they are nearly at the same distance from the camera. The regularization enforces the image smoothness on the transmission. Where the image is smooth, we expect to find the same object at a similar distance and therefore expect the transmission to change smoothly. On the other hand, when there is a significant gradient (color variance) in the image, it is likely to match to a depth discontinuity and we might see a discontinuity in the transmission as well.

Since the radiance J is positive (i.e., J≥0), Eq. (1) gives a lower bound LB on the transmission:

$$t_{LB}(x) = 1 - \min_{c \in \{R,G,B\}} \frac{I_c(x)}{A_c}$$ Eq. (13)

In He at al. (described in Single image haze removal using dark channel prior, published in in Proc. of IEEE Conf. Comput. Vis. Pattern Recognit. (CVPR) (June 2009), pp. 1956-1963, 978-1-4244-3991-1/09), the transmission estimate is based on an eroded version of $t_{LB}$. We impose this bound on the estimated transmission, per-pixel:

$$\tilde{t}_{LB}(x)=\max\{\tilde{t}(x),t_{LB}(x)\}$$ Eq. (14)

The estimation in Eq. (12) is performed per-pixel, without imposing spatial coherency. This estimation may be inaccurate when a small amount of pixels were mapped to a particular haze-line, or in very hazy areas, where r(x) is very small and noise may affect the angles significantly. The transmission map should be smooth, except for depth discontinuities, as observed by Fattal et al. (2014), Id.; K. Nishino, L. Kratz, and S. Lombardi. Bayesian defogging. *Int. Journal of Computer Vision (IJCV)*, 98(3):263-278, 2012; Tan (2008), Visibility in bad weather from a single image, in Proc. IEEE CVPR, 2008; and J.-P. Tarel and N. Hautiere. Fast visibility restoration from a single color or gray level image. In *Computer Vision, 2009 IEEE 12th International Conference on*, pages 2201-2208, September 2009 (hereinafter Tarel).

We seek a transmission map $\hat{t}(x)$ that is similar to $\tilde{t}_{LB}(x)$ and is smooth when the input image is smooth. Mathematically, we minimize the following function w.r.t. $\hat{t}(x)$:

$$\sum_x \frac{[\hat{t}(x) - \tilde{t}_{LB}(x)]^2}{\sigma^2(x)} + \lambda \sum_x \sum_{y \in N_x} \frac{[\hat{t}(x) - \hat{t}(y)]^2}{\|I(x) - I(y)\|^2},$$ Eq. (15)

where λ denotes a parameter that controls trade-off between the data and the smoothness terms, $N_x$ denotes the four nearest neighbors of x in the image plane, and σ(x) denotes the standard deviation of $\tilde{t}_{LB}$, which is calculated per haze-line.

σ(x) plays a significant role since it allows us to apply our estimate only to pixels where the assumptions hold. When the variance is high, the initial estimation is less reliable. σ(x) increases as the number of pixels in a haze line decreases. When the radii distribution in a given haze-line is small, our haze-line assumption does not hold since we do not observe pixels with different amounts of haze. In such cases, σ(x) increases as well.

The third core step of the technique is the dehazing: Once $\hat{t}(x)$ is calculated as the minimum of Eq. (13), the dehazed image is calculated using Eq. (1):

$$\hat{J}(x)=\{I(x)-[1-\hat{t}(x)]A\}/\hat{t}(x).$$ Eq. (16)

The technique is summarized in Algorithm 1 below, and exemplary results thereof are demonstrated in FIG. 6.

Intermediate and final results of our method: (a) the input hazy image, (b) the dehazed images, (c) the distance r(x) of every pixel in the hazy image to the airlight, (d) the estimated radii $\hat{r}_{max}(x)$ calculated according to Eq. (9). (e) The input image is shown, with the pixels x for which $r(x)=\hat{r}_{max}(x)$ marked by cyan circles, (f) The data term confidence in Eq. (13) colormapped (warm colors show the larger values), (g) the estimated transmission map $\hat{t}(x)$ before the regularization, (h) the final transmission map $\hat{t}(x)$ after regularization. (g) and (h) are colormapped.

Figure 6B:
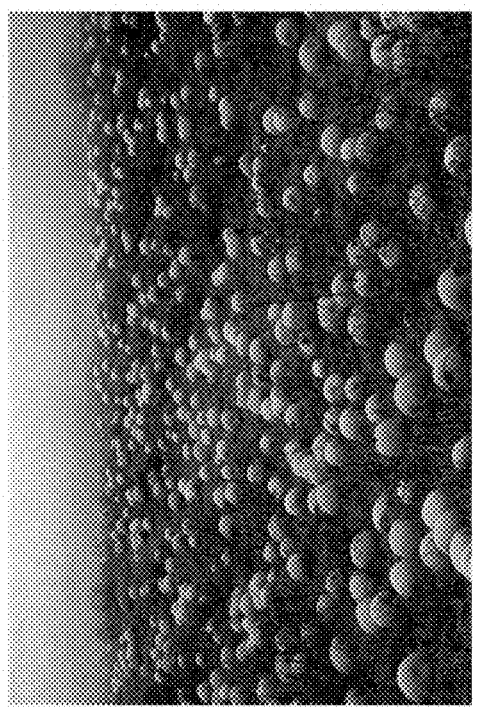
FIGS. 6a-6h show intermediate and final results of the present dehazing technique.
Figure 6D:
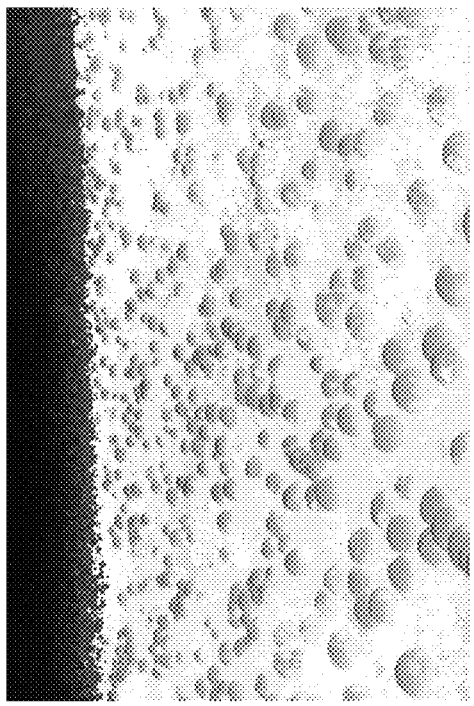
Figure 6A:
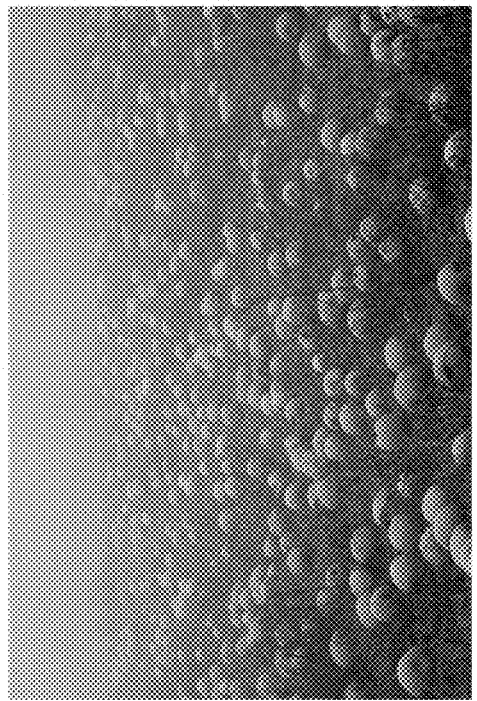
Figure 6C:
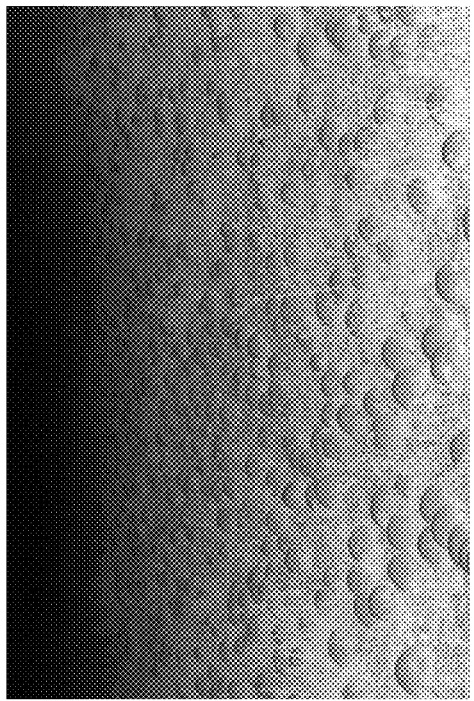
Figure 6F:
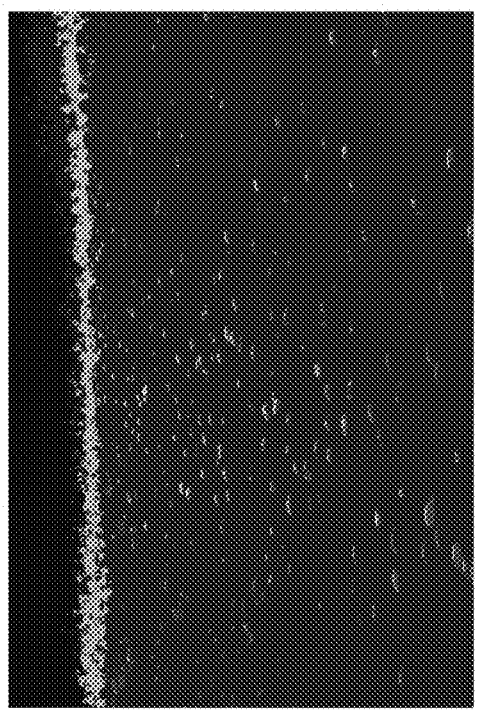
Figure 6H:
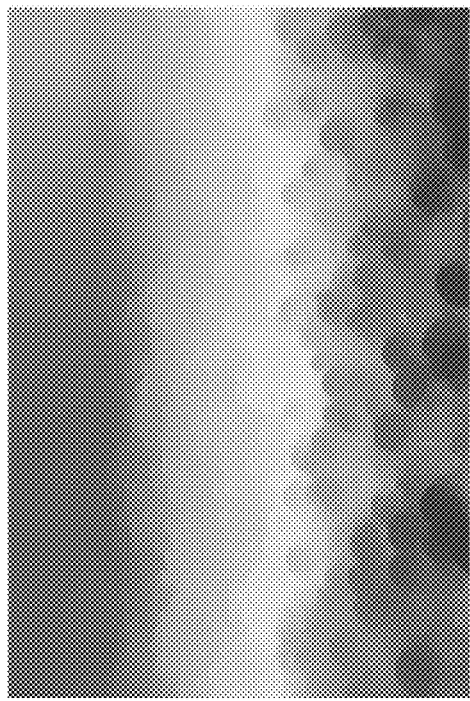
Figure 6E:
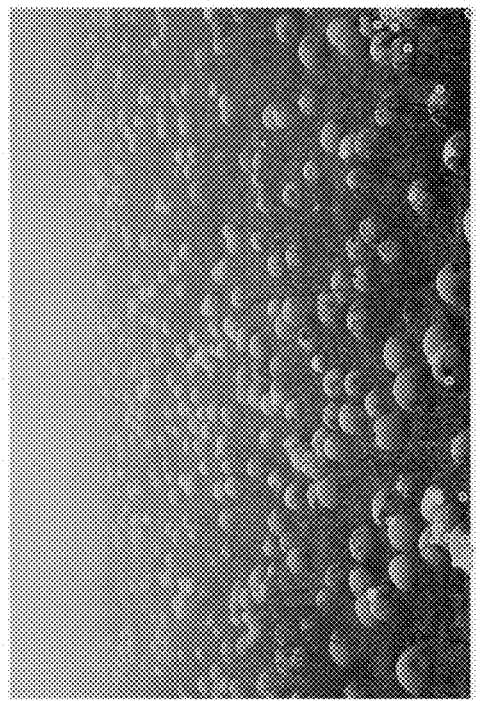
Figure 6G:
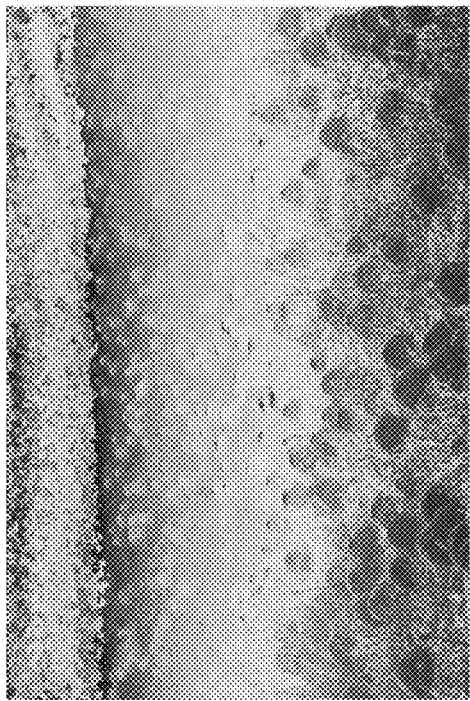
Figure 7A:
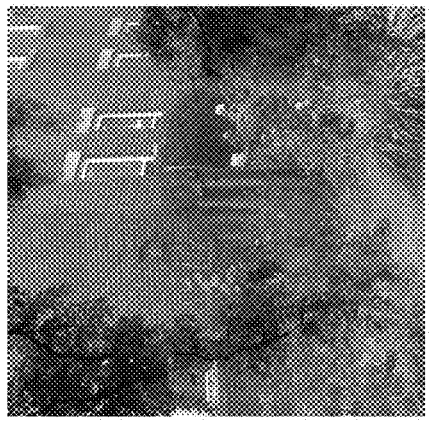
FIGS. 7a, 7b, and 7c(i)-7c(ii) show a comparison of the present dehazing technique and previous methods, on natural images.
Figure 7A:
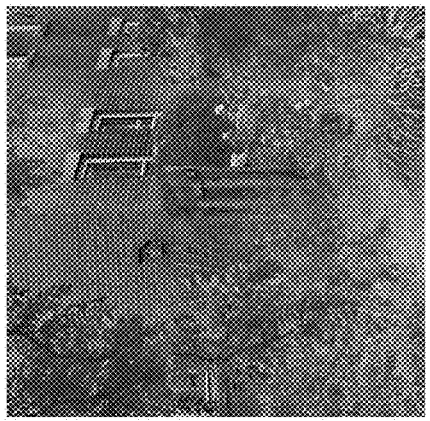
Figure 7A:
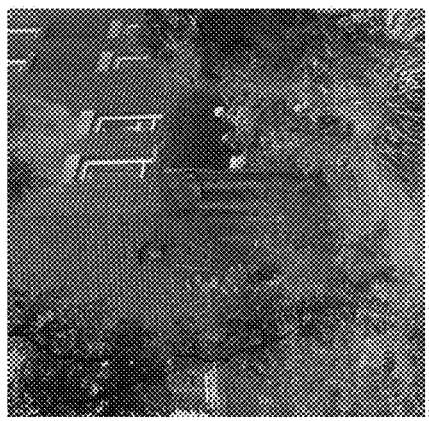
Figure 7A:
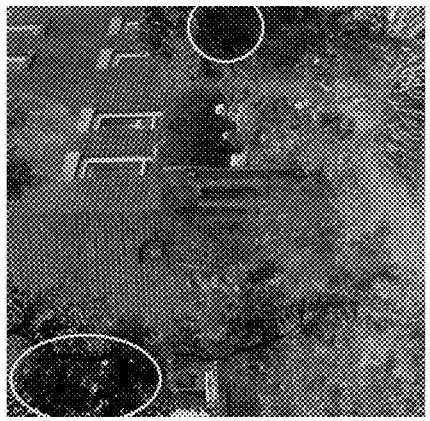
Figure 7A:
Figure 7A:
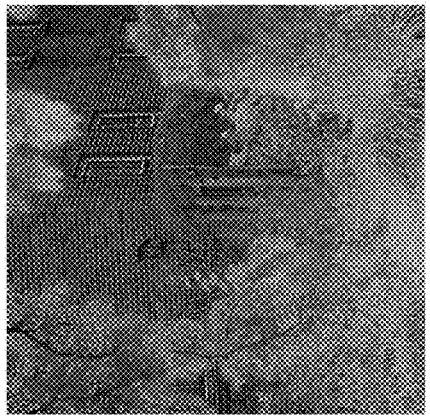
Figure 7B:
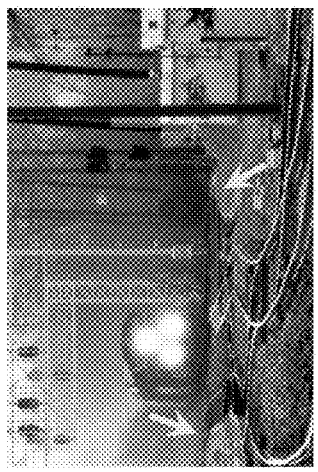
Figure 7B:
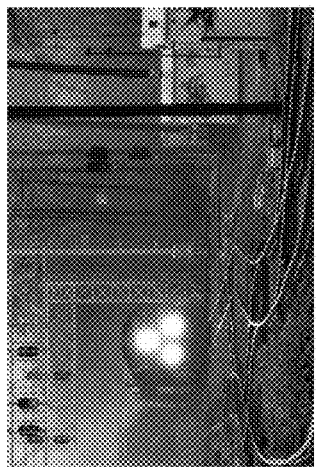
Figure 7B:
Figure 7B:
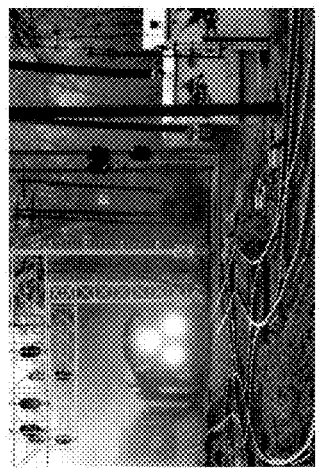
Figure 7B:
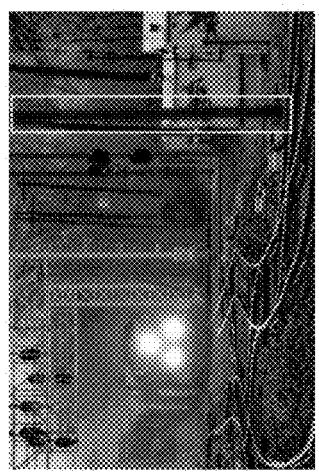
Figure 7B:
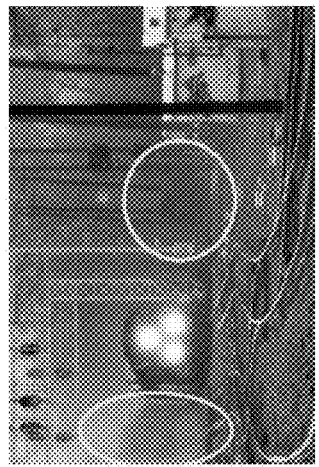
Figure 7C:
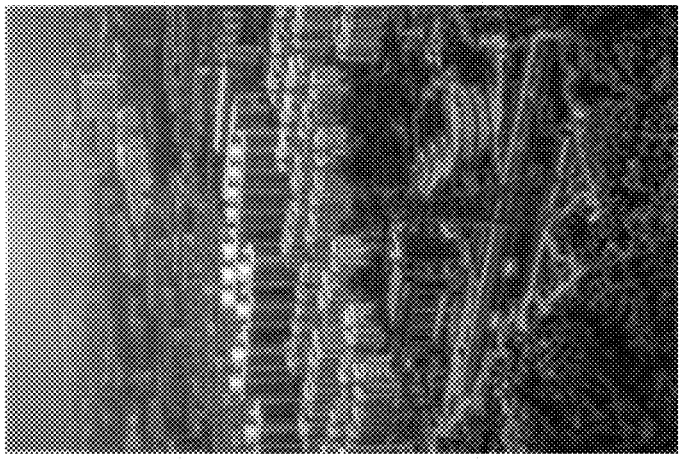
Figure 7C:
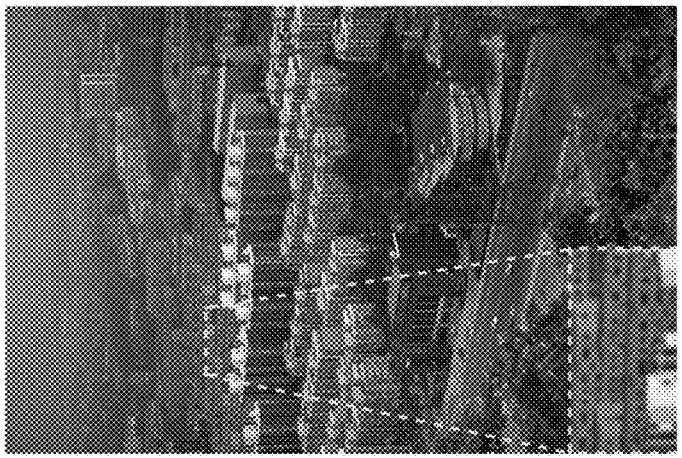
Figure 7C:
Figure 8B:
Figure 8B:
Figure 8C:
Figure 8C:
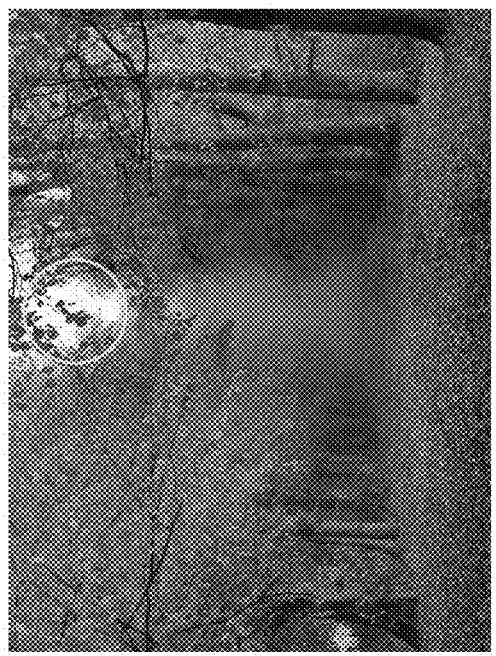
Figure 8D:
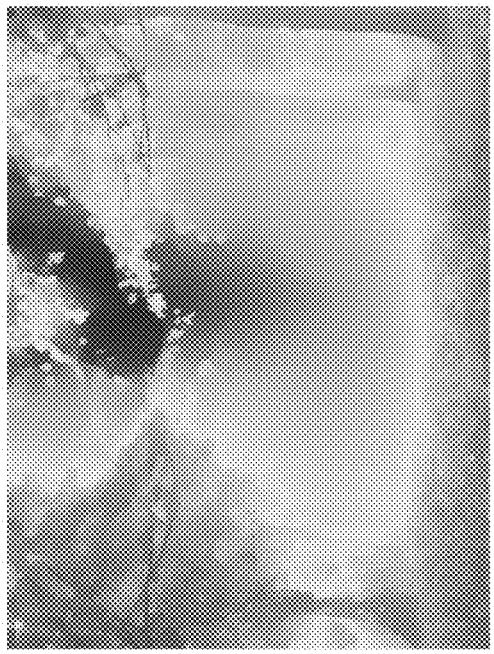
Figure 8D:

FIG. 6a shows the input hazy image. The final, dehazed image is shown in FIG. 6b. FIG. 6c shows the distance r(x) in RGB space of every pixel in the hazy image to the airlight. Note that this distance decreases as haze increases. FIG. 6d shows the maximum radii $\hat{r}_{max}(x)$ per haze-line, calculated according to Eq. (11). Observe that FIG. 6d is much brighter than FIG. 6c. Since larger values are represented by brighter colors, this indicates that the distance to the airlight is increased. The pixels x with the maximum radius in their haze-line (for which for which $r(x)=\hat{r}_{max}(x)$) are marked by cyan circles on the hazy image in FIG. 6e. Note that these pixels are mostly at the foreground, where indeed there a minimal amount of haze. We filtered out pixels that had a maximum radius in the haze line, yet had a σ>2, because the model assumptions do not hold for these haze-lines. This happens in the sky, because the distance to the airlight in RGB space is so small that clustering according to the angles is not reliable due to noise. In the regularization step this fact is taken into consideration through the data-term weight $$\frac{1}{\sigma^2(x)},$$

which is shown in FIG. 6f, which is colormapped data term confidence in Eq. (15) (warm colors depict high values). The ratio of FIGS. 6c and 6d yields the initial transmission $\tilde{t}(x)$ that is shown in FIG. 6g. The transmission map after regularization is shown in FIG. 6h. While $\tilde{t}(x)$ contains fine details even in grass areas that are at the same distance from the camera, $\hat{t}(x)$ does not exhibit this behavior. This indicates the regularization is advantageous.

---
Algorithm 1: Haze Removal.
---

Input: I(x), A
Output: $\hat{J}(x), \hat{t}(x)$
1: $I_A(x) = I(x) - A$
2: Convert $I_A$ to spherical coordinates to obtain [r(x), ϕ(x), θ(x)]
3: Cluster the pixels according to [ϕ(x), θ(x)].
   Each cluster H is a haze-line.
4: for each cluster H do
5:   Estimate maximum radius:
     $\hat{r}_{max}(x) = \max_{x \in H}\{r(x)\}$
6: for each pixel x do 7:   Estimate transmission: $\tilde{t}(x) = \frac{r(x)}{\hat{r}_{max}}$ 8: Perform regularization by calculating $\hat{t}(x)$ that minimizes Eq. 15
9: Calculate the dehazed image using Eq. (16)

---

Optionally, the clustering of pixels in spherical coordinates is performed by representing the color differences between the pixels of the digital image and the airlight value of the pixels of the digital image on a pre-computed tessellation of the unit sphere, where the pre-computed tessellation is uniformly sampled and stored in Cartesian coordinates in a k-dimensional tree (KD-tree). A KD-tree is a computerized data structure for organizing points in a space with k dimensions. It is a binary search tree with constraints imposed on it. KD trees are very useful for nearest neighbor searches (i.e. in a color space). The searching for nearest neighbors on the KD-tree may be performed using Euclidean distance coordinates. The pixel clusters are grouped with the color samples based on the nearest neighbors, thereby producing multiple groups each being one of the haze-lines.

As to the computational complexity of the present technique, the algorithm is linear in N–the number of pixels in the image, and therefore fast. The clustering is done using a nearest neighbor search on a KD-Tree with a fixed number of points. Estimating the radius within each cluster is linear in N. Therefore, the initial radius estimation is O(N). Seeking the minimum of Eq. (15) requires solving a sparse linear system, which is also O(N). Restoring the dehazed image from the transmission map is O(N) as well.

Experimental Results of the Image Dehazing Technique

The inventors have evaluated the technique on a large dataset containing both natural and synthetic images and compared its performance to state-of-the-art algorithms We assumed A is given, and used the airlight vector A calculated by M. Sulami, I. Geltzer, R. Fattal, and M. Werman. Automatic recovery of the atmospheric light in hazy images. In *Proc. IEEE ICCP,* 2014 (hereinafter Sulami). We used the same parameters for all of the images: in Eq. (15) we set λ=0.1 and we scaled $1/\sigma^2(x)$ to be in the range [0,1] in order to avoid numeric issues. In order to find the haze-lines, we sampled uniformly 1000 points on the unit sphere (FIG. 4 shows only 500 for clarity).

A synthetic dataset of hazy images of natural scenes was introduced by Fattal et al. (2014), Id., and is available online, at http://www.cs.huji.ac.il/~raananf/projects/dehaze_cl/results/, last viewed Apr. 4, 2016. The dataset contains eleven haze free images, synthetic distance maps and corresponding simulated haze images. An identically-distributed zero-mean Gaussian noise with three different noise level: $\sigma_n=0.01,0.025,0.05$ was added to these images (with image intensity scaled to [0,1]). Table 1 summarizes the $L_1$ errors on non-sky pixels (same metric used in Fattal et al. (2014), Id.) of the transmission maps and the dehazed images. Our technique is compared to the method of Fattal et al. (2014), Id. and an implementation of He et al. (2009), Id. by Fattal et al. (2014), Id. For five images out of this dataset, results of both clear and noisy images are provided by Fattal et al. (2014), Id.

TABLE 1

Comparison of L1 errors over synthetic hazy images with various amount of noise. The noise standard deviation is given and the images are scaled to the range [0, 1]. The table compares the L1 errors of the estimated transmission maps (left value) and the dehazed images (right value).

|  | σ | He et al. (2009) | Fattal et al. (2014) | The present technique |
|---|---|---|---|---|
| Road1 | 0 | 0.097/0.051 | 0.069/0.033 | 0.058/0.040 |
|  | 0.01 | 0.100/0.058 | 0.068/0.038 | 0.061/0.045 |
|  | 0.025 | 0.106/0.074 | 0.084/0.065 | 0.072/0.064 |
|  | 0.05 | 0.136/0.107 | 0.120/0.114 | 0.091/0.100 |
| Lawn1 | 0 | 0.118/0.063 | 0.077/0.035 | 0.032/0.026 |
|  | 0.01 | 0.116/0.067 | 0.056/0.038 | 0.032/0.032 |
|  | 0.025 | 0.109/0.077 | 0.056/0.065 | 0.052/0.056 |
|  | 0.05 | 0.115/0.102 | 0.114/0.121 | 0.099/0.107 |
| Mansion | 0 | 0.074/0.043 | 0.042/0.022 | 0.080/0.049 |
|  | 0.01 | 0.067/0.040 | 0.048/0.030 | 0.088/0.056 |
|  | 0.025 | 0.057/0.044 | 0.065/0.051 | 0.104/0.072 |
|  | 0.05 | 0.083/0.075 | 0.081/0.080 | 0.116/0.095 |
| Church | 0 | 0.07/0.048 | 0.039/0.025 | 0.047/0.032 |
|  | 0.01 | 0.067/0.050 | 0.053/0.043 | 0.049/0.041 |
|  | 0.025 | 0.058/0.059 | 0.089/0.081 | 0.047/0.057 |
|  | 0.05 | 0.087/0.121 | 0.121/0.136 | 0.043/0.092 |
| Raindeer | 0 | 0.127/0.068 | 0.066/0.034 | 0.089/0.045 |
|  | 0.01 | 0.119/0.066 | 0.077/0.042 | 0.093/0.049 |
|  | 0.025 | 0.109/0.067 | 0.084/0.054 | 0.104/0.063 |
|  | 0.05 | 0.117/0.085 | 0.106/0.083 | 0.131/0.092 |

As illustrated in Table 1, the present technique outperforms previous methods in most cases, and handles the noise well. As expected, our performance degrades when the noise variance increases. However, our technique maintains its ranking, with respect to other methods, regardless of the amount of noise. This shows that our algorithm is quite robust to noise, despite being pixel-based.

FIGS. 7 and 8 compare results to six state-of-the-art single image dehazing methods: C. O. Ancuti and C. Ancuti. Single image dehazing by multiscale fusion. IEEE Trans. on Image Processing, 22(8):3271-3282, 2013 (hereinafter Ancuti); Fattal et al. (2014), Id.; K. B. Gibson and T. Q. Nguyen. An analysis of single image defogging methods using a color ellipsoid framework. *EURASIP Journal on Image and Video Processing,* 2013(1), 2013; R. Luzon-Gonzalez, J. L. Nieves, and J. Romero. Recovering of weather degraded images based on RGB response ratio constancy. *Appl. Opt.,* 2014; He et al. (2009), Id.; K. Nishino, L. Kratz, and S. Lombardi. Bayesian defogging. Int. Journal of Computer Vision (IJCV), 98(3):263-278, 2012; and K. Tang, J. Yang, and J. Wang. Investigating haze-relevant features in a learning framework for image dehazing. In *Proc. IEEE CVPR,* 2014 (hereinafter Tang).

As previously noted by Fattal et al. (2014), Id., the image after haze removal might look dim, since the scene radiance is usually not as bright as the airlight. For display, we performed a global linear contrast stretch on the output, clipping 0.5% of the pixel values both in the shadows and in the highlights. Pixels whose radius is maximal in their haze-line are marked in pink on the hazy input. We marked only pixels x for which $\sigma(x)<2$ and for clarity, only ones that belong to large clusters.

The method of Ancuti et al. (2013), Id. leaves haze in the results, as seen in the areas circled in yellow. In the result of Luzon-Gonzalez et al. (2014), Id. there are artifacts in the boundary between segments (pointed by arrows). The method of Nishino et al. (2012), Id. tends to oversaturate (e.g., House). The methods of He et al. (2009), Id. and Tang et al. (2014), Id. produce excellent results in general but lack some micro-contrast when compared to Fattal et al. (2014), Id. and to ours. This is evident in the zoomed-in buildings shown in Cityscape results, where in our result and in Fattal et al. (2014), Id. the windows are sharper than in He et al. (2009), Id. and Tang et al. (2014), Id. The result of Gibson et al. (2013), Id. was not enlarged as it has a low resolution. Results of Fattal et al. (2014), Id. are sometimes clipped, e.g., the leaves in House and in the sky in Forest. Our assumption regarding having a haze-free pixel in each haze-line does not hold in Cityscape, as evident by several hazy pixels that set a maximum radius, e.g. the red buildings. Despite that, the transmission in those areas is estimated correctly due to the regularization that propagates the depth information spatially from the other haze-lines.

FIG. 8 compares both the transmission maps and the dehazed images. It shows our technique is comparable to other methods, and in certain cases works better. For example, The two rows of trees are well separated in our result when compared to He et al. (2009), Id.

Figure 9:
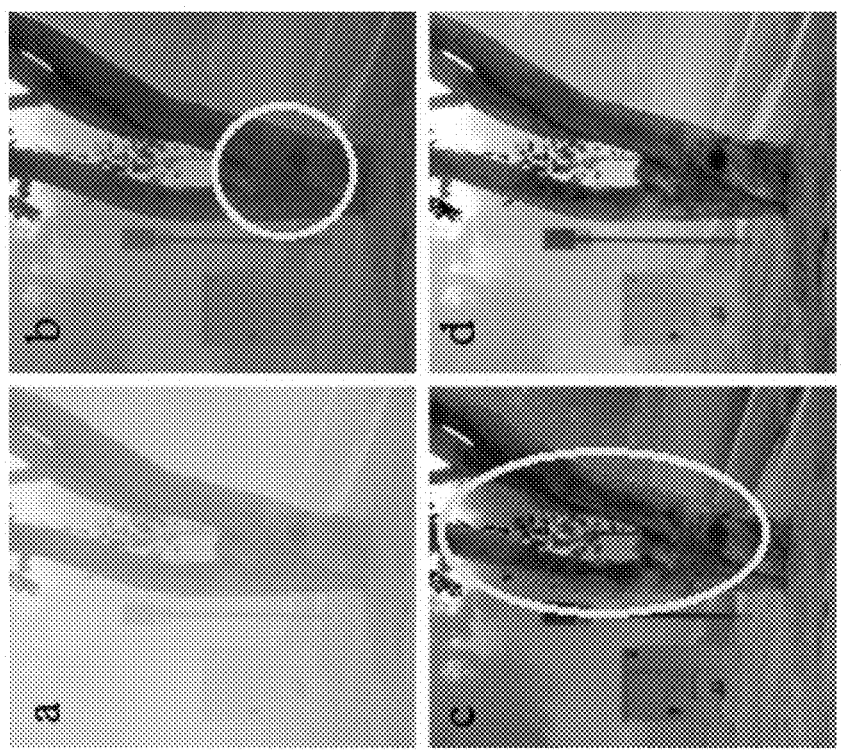
FIG. 9 illustrates the advantages of the present, global, approach over a patch-based approach.

A major advantage of the global approach of the present technique is the ability to cope well with fast variations in depth, when the details are smaller than the patch size. FIG. 9*a* shows an enlarged portion of an image, where clear artifacts are visible in the result of Fattal et al. (2014), Id. (FIG. 9*c*), around the leaves and at the boundary between the trunk and the background. FIG. 9*d* shows our result. A patch-based method is less likely to estimate the distance of such scenes accurately. The result of He et al. (2009), Id. does not exhibit these artifacts in FIG. 9*b*, because the dehazing is less effective in this image and the details are less clear (e.g, the circled trunk). This phenomena is also visible in FIG. 7 in the dehazed Cityscape image of Gibson et al. (2013), Id., where a halo between the trees in the foreground and the background is visible, and also in the train output of Fattal et al. (2014), Id. around the pole (marked by a yellow square).

Figure 10:
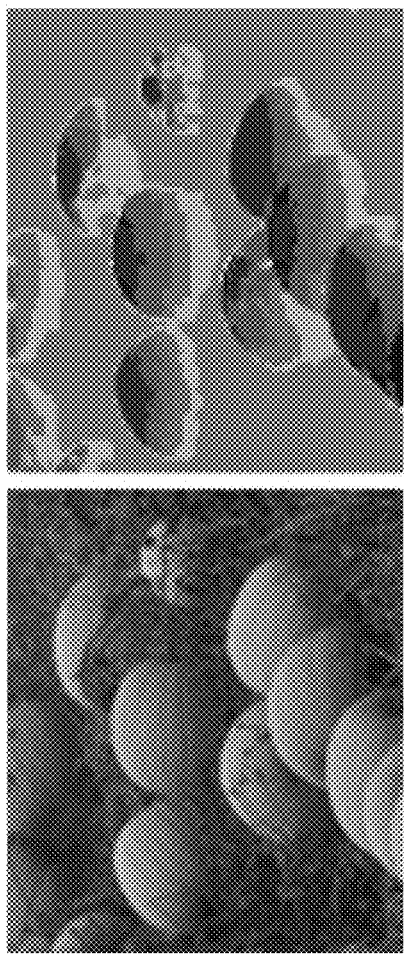
FIG. 10 illustrates color clustering.

Using a fixed tessellation of the unit sphere might raise a concern that fine tones may not be distinguished. FIG. 10 demonstrates this is not the case. The pumpkins (a crop of FIG. 6*a*) are lit from above, and therefore are brighter at the top and gradually become darker towards the ground (FIG. 10 left). FIG. 10 right depicts the cluster map—each color symbolizes a different haze-line. The gradual tone change is evident in the cluster map.

The precise technique presented above in the framework of the experimental results section is considered to be an embodiment of the present invention.

Airlight Calculation Using a Hough Transform

Optionally, a Hough transform in RGB space is used to automatically calculate airlight values, such as a set of color channel values for an airlight coordinate in RGB space. Hough transforms find imperfect instances of haze-lines by a voting procedure, the voting procedure carried out in a parameter space. Haze-line candidates are automatically obtained as local maxima in an "accumulator space" that is constructed by the Hough transform. For example, clusters of point are automatically modeled as haze-lines by the Hough transform, and each point in each cluster may vote for the airlight RGB values, such as in a naïve embodiment.

Using the Hough transforms, a global airlight value may be automatically determined in hazy images quickly and efficiently. The method is based on the haze-line model introduced herein, that considers a a cluster of pixels intensities with similar colors to form lines in RGB space under haze. These lines may intersect at the airlight color and we take advantage of this observation to find their point of intersection.

For example, given a candidate airlight coordinate in RGB space, we model pixels' intensities with a fixed set of lines emanating from the airlight candidate. That is, we wish to model pixels' values by an intersection point (i.e., the airlight) and a collection of lines (i.e., the Haze-Lines). An airlight in the correct RGB location may fit the data better than an airlight in a wrong location.

We search for an airlight point so that all lines emanating from the airlight point, in the given line directions, may fit the data. For that we use the Hough transform, where the point with the highest vote is assumed to be the airlight color. Running the Hough transform in three or four dimensions (3D or 4D) may be computationally expensive, so we may use two optional techniques to automatically accelerate the technique. One option is to work in 2D color spaces instead of a 3D color space, for example, by automatically projecting pixels' values on the RG, GB and RB planes. The second option is by automatically clustering pixels' values to collect votes for a candidate airlight from cluster centers and weight each vote by a statistical parameter of the cluster, such as the cluster size, rather than collecting votes from all pixels. The actions for processing the digital images described herein may be performed completely automatically as no user intervention is required for the steps.

For example, we reduce the problem from 3D to 2D by considering the projection of pixel values on the RG, GB and RB planes. We may combine the votes in the three planes to obtain the final airlight estimation, such as a single airlight value selected from multiple airlight candidates. As used herein the term airlight color channel value set means a set of three or more color channel values, corresponding to the pixel color channel values. For example, the set is a set of RGB values. This has a dramatic effect on the number of airlight candidates we need to sample and evaluate. Second, we may cluster all pixels in the image into roughly a thousand clusters. As a result of the optional improvements, the airlight value may be determined in a matter of seconds, as opposed to minutes in the naïve implementation. We demonstrate our method on other real-world images and synthetic data. Our method may be more efficient than state-of-the-art methods (linear vs. quadratic complexity) and performs on-par with them. For example, the proposed algorithm's complexity is linear in the number of pixels in the image, compared to alternatives which are quadratic. As a reference, the run-time of our MATLAB implementation on a desktop with a 4th generation Intel core i7 CPU @3.4 GHz and 32 GB of memory is on average 6 seconds for a 1 Mpixel image.

Following is a detailed technical description of applying the Hough transform technique for determining airlight values. When using a Hough transform to estimate the airlight value, we may detect unknown parameters of a model given noisy data via a voting scheme. In this case, the voting procedure is carried out in a parameter space consisting of candidate airlight values in RGB space. In particular, we uniformly sample a fixed set of line angles $\{\theta_k, \phi_k\}_{k=1}^{K}$. Given this set, we consider a discrete set of possible airlight values. The distance between a pixel I(x) and the line defined by the airlight value A and a pair of angles $(\theta, \phi)$ is:

$$d(I(x), (A,\phi,\theta)) = \|(A-I(x)) \times (\cos(\theta), \sin(\phi))\|. \quad \text{Eq. (35)}$$

A pixel vote may be assigned to a candidate A when the distance to one of the lines is smaller than a threshold $\tau$. This threshold is adaptive and depends on the distance between A and I(x) to allow for small intensity variations. For example, instead of working with cylinders (lines with a fixed threshold) we work with cones (lines with a variable threshold). Formally:

$$\tau = \tau_0 \cdot \left(1 + \frac{\|I(x) - A\|}{\sqrt{3}}\right). \quad \text{Eq. (36)}$$

In addition, we allow a pixel to vote only for an airlight that is brighter than the pixel, such as by computing the brightness from the color channel values and comparing. This is due to the fact that bright objects are quite rare, as shown empirically to justify the dark channel prior, and usually do not contain information about the haze (e.g., a bright building close to the camera).

The best representation of the pixels' values from a hazy image may be found with airlight A and fixed line directions $\{\theta_k, \phi_k\}_{k=1}^{K}$. This may be formulated as follows:

$$\operatorname*{argmax}_{A} \sum_x \sum_k 1[d(I(x), (A, \phi_k, \theta_k)) < \tau] \cdot 1[A > I(x)], \quad \text{Eq. (37)}$$

where 1[•] is an indicator function that equals 1 when true and equals 0 otherwise. The term 1[A>I(x)] equals 1 when all elements of A are greater than the corresponding elements of I(x).

A huge value of A>>1 might be chosen as the solution, since it maximizes Eq. 37 the pixels in the same large cone. To prevent this, we give a larger weight to values of A that are close to the pixel's values. Formally, we optimize:

$$\operatorname*{argmax}_{A} \sum_x \sum_k f(\|I(x) - A\|) \cdot \quad \text{Eq. (38)}$$
$$1[d(I(x), (A, \phi_k, \theta_k)) < \tau] \cdot 1[A > I(x)],$$

where $f(y) = 1 + 4 \cdot e^{-y}$ is a fast decaying weight that gives preference to values of A in the vicinity of the pixel's distributions.

Optimizing Airlight Computational Efficiency

The proposed scheme, which includes collecting votes from all pixels for all angles and airlight candidates in the 3D RGB space, is computationally expensive. Therefore, we propose the following approximations, which significantly accelerate the computation while maintaining accuracy. The first, clustering the colors in the image and using the cluster centers instead of all the pixels. The second, performing the voting scheme in two dimensions. The voting is repeated three times, with only two of the (R,G,B) color channels being used each time.

Color clusters may be quantized before the Hough voting, such as quantizing the image into N clusters. We may do this by converting the RGB image into an indexed image with a unique color palette of length N. This may give us a set of N typical color values, $\{I_n\}_{n=1}^{N}$, where N is much smaller than the number of pixels in the image. In addition, we have $\{w_n\}_{n=1}^{N}$, the number of pixels in the image belonging to each cluster. During the Hough voting procedure, each representative color value $I_n$ votes based on its distance to the candidate airlight, and the vote has a relative strength $w_n$. Therefore, the final optimization function is:

$$\operatorname*{argmax}_{A} \sum_n \sum_k w_n \cdot f(\|I_n - A\|) \cdot \quad \text{Eq. (39)}$$
$$1[d(I_n, (A, \phi_k, \theta_k)) < \tau] \cdot 1[A > I_n].$$

Calculating the full 3D accumulator for all possible airlight values is computationally expensive. Therefore, voting e may be done in a lower dimension. The accumulator may be seen as the joint probability distribution of the airlight in all color channels, where the final selected value is the one with the maximal probability. By performing the accumulation two color channels at a time, we calculate three marginal probabilities, where each time the summation is performed on a different color channel. Finally, we look for a candidate airlight that may maximize the 3D volume created by the outer product of the marginal accumulators. The proposed Hough technique is summarized in Algorithm 2.

---

Algorithm 2: Airlight Estimation

Input: hazy image, I(x)
Output: airlight value, Â
1: cluster the pixels' colors and generate an indexed image Î(x) whose values are $n \in \{1, \ldots, N\}$, a colormap $\{I_n\}_{n=1}^{N}$, and cluster sizes $\{W_n\}_{n=1}^{N}$
2: for each pair of color channels $(c_1, c_2) \in \{RG, GB, RB\}$ do
3:   initialize $\text{accum}_{c_1, c_2}$ to zero
4:   for $A = (m \cdot \Delta A, 1 \cdot \Delta A), m, l \in \{0, \ldots, M\}$ do
5:     for $\theta_k = \frac{\pi}{k}, k \in \{1, \ldots, K\}$ do
6:       for $n \in \{1, \ldots, N\}$ do
7:         $d = |(A - I_n(c_1, c_2)) \times (\cos(\theta_k), \sin(\theta_k))|$
8:         if $(d < \tau) \wedge (m \cdot \Delta A > I_n(c_1)) \wedge (l \cdot \Delta A > I_n(c_2))$ then
           $\text{accum}_{c_1, c_2}(k, m, l) \mathrel{+}= w_n \cdot f(\|A - I_n\|)$ -continued Algorithm 2: Airlight Estimation 9: $\hat{A} = \mathrm{argmax}\{\mathrm{accum}_{R,G} \otimes \mathrm{accum}_{G,B} \otimes \mathrm{accum}_{R,B}\}$, where $\otimes$ is an outer product
10: Return The algorithm's run-time depends on the following parameters: the number of pixels in the image P, the number of airlight candidates (in each color channel) M, the number of color clusters N and the number of haze-line orientations K. The conversion from RGB to an indexed image has a run-time complexity of O(NP), while the airlight estimation using the indexed image has a run-time complexity of $O(NKM^2)$.

Figure 18:
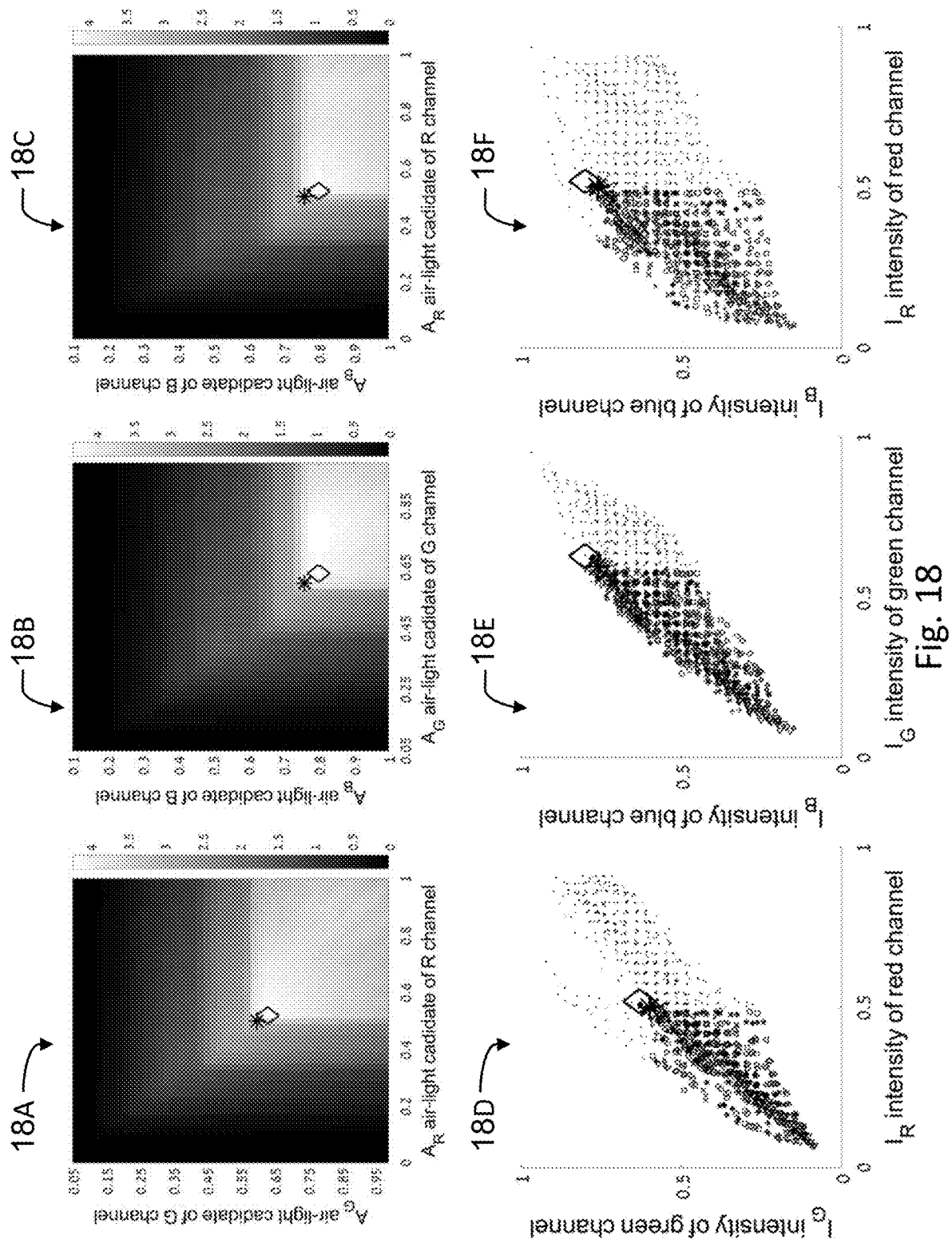
FIGS. 18a-18f show an exemplary selection of airlight values from Hough transform.

Reference is now made to FIG. 18, which shows an exemplary selection of airlight values 18A, 18B, and 18C from Hough transform. Hough transform votes for the image show color clusters $\{I_n\}_{n=1}^{N}$ projected onto 3 different 2D planes 18D, 18E, and 18F. Each cluster n is marked by a circle with a size proportional to $w_n$. The ground-truth (GT) airlight is marked by a green circle while our estimate is marked by a purple diamond. The GT values are determined by a train operator selecting the airline values manually from the image. Each colored cluster votes for the GT value, where different colors indicate different haze-lines. The gray colored clusters do not vote for the GT since the following holds: $1[A>I_n]=0$. The three voting arrays 18A, 18B, and 18C show $\mathrm{accum}_{c_1,c_2}$, $(c_1, c_2) \in RG,GB,RB$ as a function of the candidate air-light values. The color-map indicates the number of votes, and an airlight value set is selected from the accumulated assigned votes from all pixels. In this case, the ground-truth air-light had the most votes in all planes (strong yellow color). The bottom row images 18D, 18E, and 18F show the distribution of the clustered pixels in RGB space. We show 2D plots since these projections are used in the 2D voting procedure (step 8 of Algorithm 1) and may improve visualization. The airlight value is pointed at by the strongest haze-lines.

Experimental Results of the Hough Airlight Technique

We validate the proposed method on a diverse set of images. In all of our experiments we use the following parameters: N=1000, the number of color clusters for each image (some images have less typical colors, resulting in empty clusters and N<1000 in practice); K=40, the number of angles, i.e., haze-lines, in each plane; all of the pixels' intensities are normalized to the range [0,1], and therefore we set $\Delta A=0.02$ and $$M = \frac{1}{\Delta A};$$

the threshold $\tau_0=0.02$ determines whether a pixel $I_n$ supports a certain haze-line.

Figure 19:
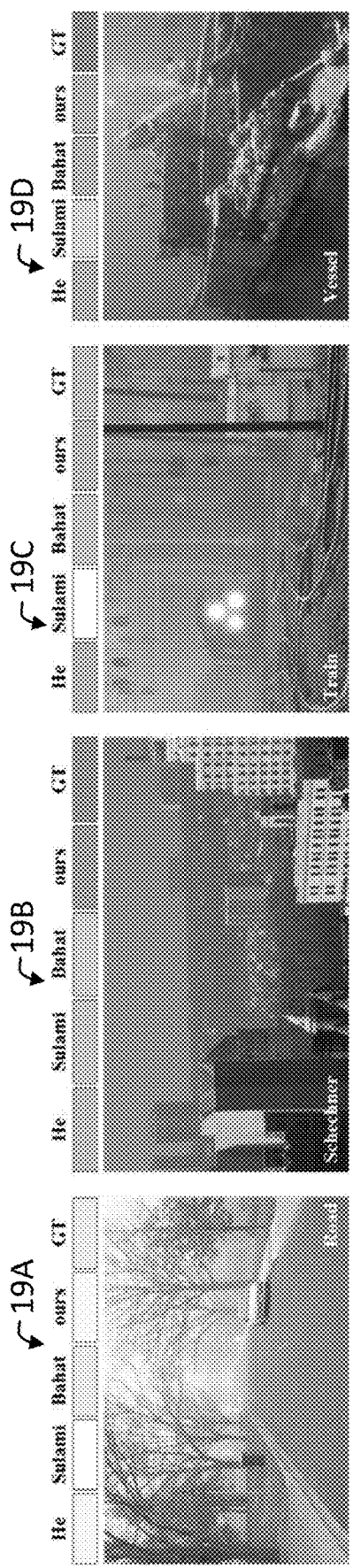
FIGS. 19a-19d show images used for comparison of selection of airlight values computed with Hough transform and with alternative techniques.

Reference is now made to FIG. 19, which shows images used for comparison of airlight values computed with Hough transform and with alternative techniques. These images show the results from evaluating the accuracy of the estimated airlight on natural images with different techniques. The results are from the techniques of Sulami, He et al, Bahat et al (described in Blind dehazing using internal patch recurrence, Proceedings of the 2016 IEEE International Conference on Computational Photography (ICCP), 13-15 May 2016, EISBN: 978-1-4673-8623-4, DOI: 10.1109/ICC-PHOT.2016.7492870), and the present invention. Following is table 2 summarizing the $L_2$ errors between the techniques from analysis of 40 images.

TABLE 2

| Statistic | Ours | Bahat | He | Sulami |
|---|---|---|---|---|
| Mean L2 error | 0.119 | 0.111 | 0.129 | 0.255 |
| Median L2 error | 0.063 | 0.086 | 0.109 | 0.191 |
| Variance | 0.014 | 0.013 | 0.013 | 0.061 |

Generally, the present embodiment and Bahat outperformed the others. Compared to Bahat, our embodiment results in a lower median error, with slightly higher mean and variance. The performance depends on the extent the image adheres to the prior used by each method.

Images 19A, 19B, 19C, and 19D show examples of hazy images, along with their manually extracted ground-truth airlight (GT) colors (modified to in gray scale). Following are tables of values corresponding to the airlight colors of the images by the different methods.

TABLE 3

| | range: | 0-1 | |
|---|---|---|---|
| Image 19A | name | = | road.png |
| He: | 0.94118 | 0.97647 | 0.98824 |
| Sulami: | 1.1842 | 1.2987 | 1.353 |
| Bahat: | 0.85481 | 0.92456 | 0.94885 |
| ours: | 0.96 | 0.99 | 1 |
| GT: | 0.84428 | 0.93775 | 0.97859 |
| Image 19B | name | = | schechner.png |
| He: | 0.76078 | 0.73333 | 0.6902 |
| Sulami: | 0.48603 | 0.8293 | 1.1188 |
| Bahat: | 0.84718 | 0.79573 | 0.73942 |
| ours: | 0.52 | 0.63 | 0.8 |
| GT: | 0.50074 | 0.59792 | 0.75972 |
| Image 19C | name | = | train.png |
| He: | 0.70588 | 0.70588 | 0.71373 |
| Sulami: | 510183.8 | 510183.5 | 510185 |
| Bahat: | 0.75459 | 0.75287 | 0.7529 |
| ours: | 0.72 | 0.71 | 0.72 |
| GT: | 0.72548 | 0.72693 | 0.73123 |
| Image 19D | name | = | underwaterVessel.png |
| He: | 0.56471 | 0.71765 | 0.68235 |
| Sulami: | 0.16142 | 2.2662 | 3.5469 |
| Bahat: | 0.42121 | 0.76008 | 0.93351 |
| ours: | 0.42 | 0.75 | 0.92 |
| GT: | 0.28975 | 0.60814 | 0.83459 |

TABLE 4

| | range: | 0-255 | |
|---|---|---|---|
| Image 19A | name | = | road.png |
| He: | 240 | 249 | 252 |
| Sulami: | 255 | 255 | 255 |
| Bahat: | 218 | 236 | 242 |

TABLE 4-continued

| | range: | 0-255 | |
|---|---|---|---|
| ours: | 245 | 252 | 255 |
| GT: | 215 | 239 | 250 |
| Image 19B | name | = | schechner.png |
| He: | 194 | 187 | 176 |
| Sulami: | 124 | 211 | 255 |
| Bahat: | 216 | 203 | 189 |
| ours: | 133 | 161 | 204 |
| GT: | 128 | 152 | 194 |
| Image 19C | name | = | train.png |
| He: | 180 | 180 | 182 |
| Sulami: | 255 | 255 | 255 |
| Bahat: | 192 | 192 | 192 |
| ours: | 184 | 181 | 184 |
| GT: | 185 | 185 | 186 |
| Image 19D | name | = | underwaterVessel.png |
| He: | 144 | 183 | 174 |
| Sulami: | 41 | 255 | 255 |
| Bahat: | 107 | 194 | 238 |
| ours: | 107 | 191 | 235 |
| GT: | 74 | 155 | 213 |

The error bars corresponding to them in 19E are labeled. In the Road image 19A our error is larger than Bahat. This may be caused by several bright pixels that have a high red value. In the Schechner image 19B our method outperforms all methods. In the Train image 19C shows that all methods except Sulami perform well. In the Vessel image 19D all methods yield relatively high errors. This may be because the airlight is not uniform across the scene.

Figure 20:
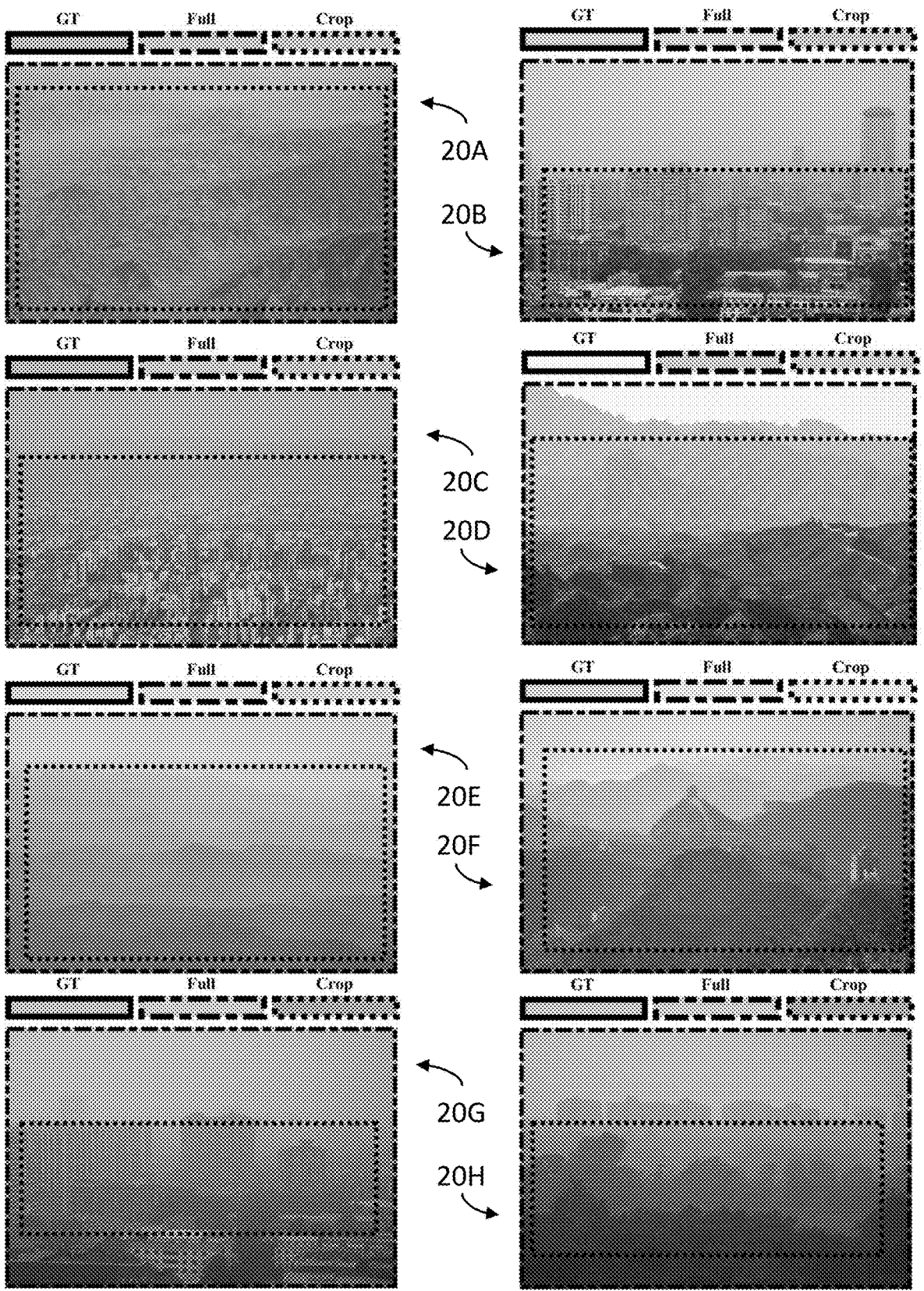
FIGS. 20a-20h show a comparison of selections of airlight values from Hough transform for images with and without visible sky.

Reference is now made to FIG. 20, which shows a comparison of selections of airlight values from Hough transform for images 20A, 20B, 20C, 20D, 20E, 20F, 20G, and 20H with and without visible sky. First, we estimated the airlight using the entire image, and received an average error of 0.116 (median error 0.091). Second, in order to test performance in images that do not contain sky patches, we repeated the estimation process with a cropped image. The average error increased to 0.231 (median error 0.25). In FIG. 20 the images the cropped region is marked by a dotted line. The estimated airlight values of the full and cropped images are shown, as well as the GT value extracted manually from the images. Our cropped image estimations are close to the ones estimated from the full image. The largest error, both before and after cropping, was calculated for the right image on the second row from the top—it had an $L_2$ error of 0.35.

Figure 21:
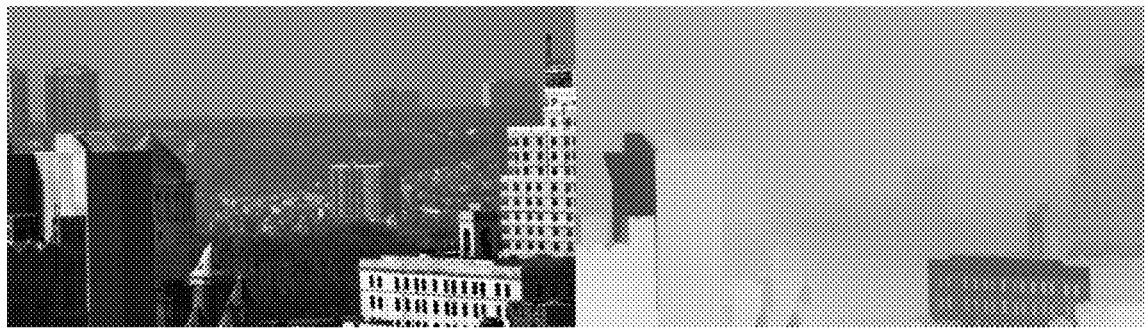
FIGS. 21a-21d show a comparison of dehazing between Hough transform and an alternative technique.
Figure 21:

Reference is now made to FIG. 21, which shows a comparison of dehazing between Hough transform 21C and 21D and an alternative technique 21A and 21B. Shown are end-to-end dehazing results using both the airlight estimation described in He et al and the airlight estimation of an embodiment of the current technique. Both using an embodiment and the dehazing method described herein. Using different airlight values shows the effect of the estimation on the output dehazed image. Images 21C and 21D show a successful example where the airlight was accurately estimated for the Schechner image 19B. The incorrect value estimated by He et al leads to an incorrect transmission map 21B, while the transmission in 21D approximately describes the scene structure. In the transmission maps, the darker colors are farther from the sensor, and the lighter are closer. Seen in 21B, the previous technique, the image intensities cause the brighter buildings to be considered farther (bottom right), awhile in 21D the transmission maps shows much better visual correspondence with the "depth" of the depicted objects.

Following are results of a comparative analysis of synthetic images. In Sulami, the images were simulated from haze-free RGB images and their distance maps, gathered from the Lightfields and the Middlebury datasets used respectively in He et al and Scharstein et al (described in A taxonomy and evaluation of dense two-frame stereo correspondence algorithms, IJCV, 47(1-3):7-42, 2002). The transmission maps were calculated by $t(x)=e^{-\beta d(x)}$, and $\beta$ was chosen such that the most distant object in the scene received $t=0.1$. The airlight magnitude was uniformly sampled in the range [0.8,1.8] and the orientation was uniformly sampled from the 10° cone around [1,1,1]. The sampling process was repeated three times for each image and the results are reported in Sulami. We did not perform a per-image comparison of the techniques. Instead we report average and median errors in Table 5.

TABLE 5

| | | He | Tan | Tarel | Sulami | Ours |
|---|---|---|---|---|---|---|
| | | Orientation | | | | |
| Mean | | 3.218 | 3.576 | 3.253 | 0.581 | 0.043 |
| Median | | 3.318 | 3.316 | 3.49 | 0.22 | 0.037 |
| | | Magnitude | | | | |
| Mean | | 0.172 | 0.218 | 0.412 | 0.157 | 0.178 |
| Median | | 0.141 | 0.208 | 0.393 | 0.116 | 0.095 |
| | | $l_\infty$ Endpoint Error | | | | |
| Mean | | 0.147 | 0.177 | 0.278 | 0.103 | 0.141 |
| Median | | 0.144 | 0.178 | 0.286 | 0.077 | 0.106 |

Some of the images in this dataset are indoor images, whose depth distribution is significantly different from that of outdoor images. Despite that, our results are competitive. Specifically, our orientation estimation is the most accurate, which is significant. It has been shown in [15] that estimating the airlight's orientation is more important than its magnitude, since errors in the orientation induce color distortions in the dehazed image, whereas magnitude errors induce only brightness distortions. FIG. 5 shows two examples of synthetic images used in this experiment.

Underwater Image Restoration

As light propagates in water it is attenuated and scattered. Both effects depend on the distance the light travels and its wavelength, as shown, for example, by Mobley, C. D.: Light and water: radiative transfer in natural waters. Academic press (1994). The wavelength-dependent attenuation causes color distortions that depend on the object's distance and therefore cannot be globally compensated for. The scattering induces a distance dependent additive component on the scene that reduces contrast. As a result, many underwater images appear blue and lack vivid colors.

Nevertheless, color and contrast are extremely important for visual surveys in the ocean. For example, enhanced images may improve automatic segmentation, increase the quality of feature matching between images taken from multiple viewpoints, and aid in identification.

Present embodiments aim to recover the object's colors in scenes photographed under ambient illumination in water using solely a single image as an input. Another aim is to recover a distance map of the photographed scene. This problem is closely related to the single image dehazing problem discussed above, in which images are degraded by weather conditions such as haze or fog. The above dehazing technique assumes that the attenuation is uniform across colors.

Under water, where the assumption of color-independent attenuation does not hold, there are theoretically three unknown transmission values per pixel (one per channel), yielding six unknowns with only three measurements. However, the color-dependent transmission is related to the distance via the attenuation coefficients. Based on this relation we show that the problem may be reduced to four unknowns per pixel as before, with two new global parameters—the ratios between the attenuation coefficients of the color channels.

We show that when the attenuation ratios between the different channels are known, then the input image may be converted to a medium-compensated image where the attenuation coefficient is the same for all color channels. Then, the above image dehazing technique may be used to solve the problem. In alternative embodiments, other image dehazing techniques may be applied to the medium-compensated image. We are left with the question of how to estimate the two additional global parameters. To this end, we show that using the wrong parameters results in images with distorted colors. Hence, we automatically choose the parameters as the ones that yield the best looking image. This is defined as the image that best adheres to the gray world assumption, that was used before for above and under water imaging. We find the correct parameters by sampling the parameter space, which is bounded by known physical measurements of naturally occurring water types.

The results of experiments conducted by the inventors demonstrate single image restoration of underwater scenes using the full physical image formation model. Thus, we are able to recover complex 3D scenes and, in addition, estimate the water properties.

We follow the model developed in Schechner, Y. Y., Karpel, N.: Recovery of underwater visibility and structure by polarization analysis. *IEEE J. Oceanic Engineering* 30(3) (2005) 570-587. In each color channel $c \in \{R,G,B\}$, the image intensity at each pixel is composed of two components, attenuated signal and veiling-light:

$$I_c(x) = t_c(x)J_c(x) + (1-t_c(x)) \cdot A_c, \qquad \text{Eq. (17)}$$

where x denotes the pixel coordinate, $I_c$ denotes the acquired image value in color channel c, $t_c$ denotes the transmission of that color channel, and $J_c$ denotes the image value of the object that would have been acquired without the scattering and absorption of the water medium. The global veiling-light component $A_c$ denotes the scene value in areas with no objects (t=0). Eq. (17) applies to linear captured data, prior to in-camera processing such as color-space conversion, gamma correction and compression. Therefore, I refers to the image obtained from the raw file after minimal processing such as demosaicing and black current subtraction, as disclosed by Akkaynak, D., Treibitz, T., Xiao, B., Gürkan, U. A., Allen, J. J., Demirci, U., Hanlon, R. T.: Use of commercial off-the-shelf digital cameras for scientific data acquisition and scene-specific color calibration. JOSA A 31(2) (2014) 312-321; and in Sumner, R.: Processing raw images in matlab. https://users.soe.ucsc.edu/rcsumner/raw-guide/RAWguide.pdf (2014), last viewed Apr. 4, 2016.

The transmission depends on object distance z and the water attenuation coefficient for each channel $\beta_c$:

$$t_c = \exp(-\beta_c z). \qquad \text{Eq. (18)}$$

Under water, the attenuation of red colors may be an order of magnitude larger than the attenuation of blue and green, os observed, for example, by Mobley, C. D.: Light and water: radiative transfer in natural waters. Academic press (1994). Therefore, as opposed to the common assumption in single image dehazing, the transmission t is wavelength-dependent.

Figure 11:
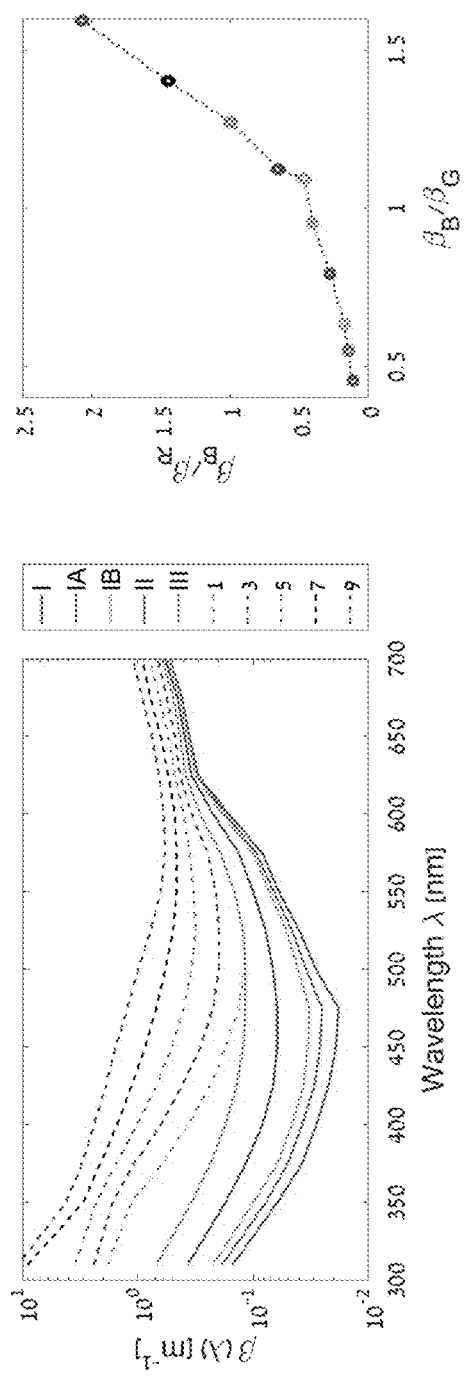
FIG. 11 illustrates attenuation coefficients of Jerlow water types.

Jerlov, N. G.: *Marine optics*. Volume 14. Elsevier (1976) developed a frequently used classification scheme for oceanic waters, based on water clarity. The Jerlov water types are I, IA, IB, II and III for open ocean waters, and 1 through 9 for coastal waters. Type I is the clearest and type III is the most turbid open ocean water. Likewise, for coastal waters, type 1 is clearest and type 9 is most turbid. FIG. 11 (Left) depicts the attenuation coefficients of Jerlov water types; the figure was adapted from data in Mobley et al. (1994), Id., based on measurements in Austin, R., Petzold, T.: Spectral dependence of the diffuse attenuation coefficient of light in ocean waters. *Optical Engineering* 25(3) (1986) 253471-253471. Solid lines mark open ocean waters while dashed lines mark coastal waters.

When capturing an image using a commercial camera, three color channels R,G,B are obtained. Thus, we are interested in three attenuation coefficients: $(\beta_R, \beta_G, \beta_B)$. We show below that the three attenuation coefficient themselves are not required for transmission estimation, but rather their ratios (two variables). FIG. 1 (Right) shows the ratios of the attenuation coefficients: $\beta_B \beta_R$ vs. $\beta_B \beta_G$ of Jerlov water types for wavelengths of peak camera sensitivity according to Jiang, J., Liu, D., Gu, J., Susstrunk, S.: What is the space of spectral sensitivity functions for digital color cameras? In: *Proc. IEEE Workshop Applications of Computer Vision (WACV)*. (2013) 168-179.

FIG. 12 demonstrates the effect of scattering medium on observed scene colors.

Figure 12A:
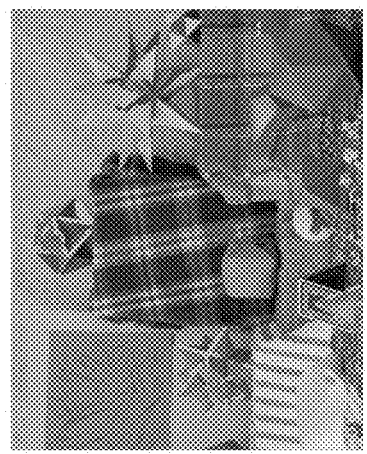
FIGS. 12a-12f demonstrate the effect of scattering medium on observed scene colors.

FIG. 12a shows a scene with four different clusters of similar colors J marked. Pixels of a haze-free color image are clustered using K-means. Pixels belonging to four of the clusters are marked. Note that the pixels are non-local and are spread all over the image plane.

Figure 12C:
Figure 12E:
Figure 12B:
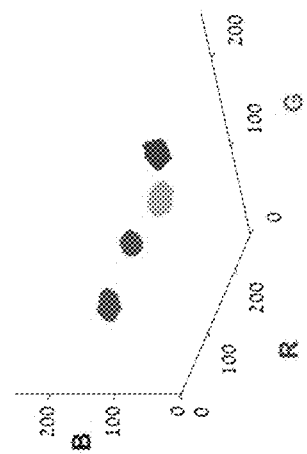

FIG. 12b shows the same pixels in RGB space, with colors of the clusters corresponding to the highlighted pixels in FIG. 12b.

FIG. 12c shows the same scene with added synthetic haze. The same clustered pixels are marked, but their observed colors are affected by different amounts of haze.

FIG. 12e shows the scene as if it was captured under water.

Figure 12D:
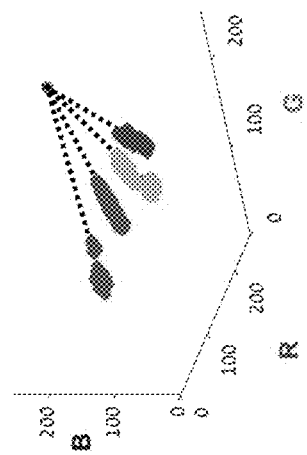
Figure 12F:
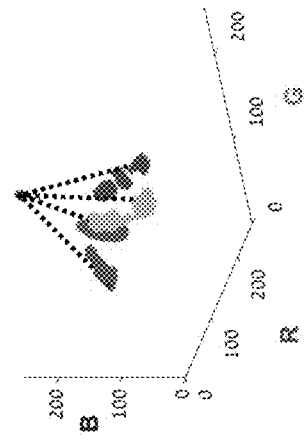

FIGS. 12d and 12f show the corresponding pixels in RGB space for haze and underwater, respectively. In FIG. 12d, the hazy pixels are distributed haze-lines passing through the airlight, marked in black. In FIG. 12f, the cluster pixels are distributed along curves that do not coincide with the linear lines spanned by the original color and the veiling-light (the haze-lines), due to the wavelength-dependent attenuation. In haze, the attenuation is mostly wavelength independent and the tight color clusters become haze-lines. However, under water, the attenuation is wavelength-dependent, and the clusters become curves.

We first show that the absolute values of the attenuation coefficients are not required for recovery. Instead, we show how to reconstruct the scene using only two global ratios between the attenuation coefficients. Then, we show how to estimate the ratios of the attenuation coefficients from the image itself.

We modify the non-local single image dehazing technique discussed above, to take into account different attenuation coefficients for the different color channels.

Given attenuation ratios, we convert the input image into a medium compensated image where all three channels have the same attenuation coefficient. Then we apply the present dehazing technique (or a different one known in the art) to solve the problem.

We assume $A_c$ is extracted from a patch in the image.

Combining and rearranging Eqs. (1a, 2a) yields for the blue channel:

$$A_B - I_B = e^{-\beta_B z} \cdot (A_B - J_B),  \quad \text{Eq. (19)}$$

and the same for the red channel:

$$A_R - I_R = e^{-\beta_R z} \cdot (A_R - J_R). \quad \text{Eq. (20)}$$

Raising Eq. (20) to the power of $$\frac{\beta_B}{\beta_R}$$

yields $$(A_R - I_R)^{\frac{\beta_B}{\beta_R}} = e^{-\beta_R z \frac{\beta_B}{\beta_R}} \cdot (A_R - J_R)^{\frac{\beta_B}{\beta_R}} = t_B \cdot (A_R - J_R)^{\frac{\beta_B}{\beta_R}}. \quad \text{Eq. (21)}$$

Denote the ratios between the attenuation coefficients:

$$\beta_{BR} = \beta_B/\beta_R, \beta_{BG} = \beta_B/\beta_G. \quad \text{Eq. (22)}$$

Then, in this medium-compensated space we achieve a form similar to Eq. (1), with one unknown transmission per-pixel, common to all color channels:

$$\begin{bmatrix} (I_R(x) - A_R)^{\beta_{BR}} \\ (I_G(x) - A_G)^{\beta_{BG}} \\ (I_B(x) - A_B) \end{bmatrix} = t_B(x) \begin{bmatrix} (J_R(x) - A_R)^{\beta_{BR}} \\ (J_G(x) - A_G)^{\beta_{BG}} \\ (J_B(x) - A_B) \end{bmatrix} \quad \text{Eq. (23)}$$

This form is similar to the haze-lines formulation. We expect to find haze-lines in the medium-compensated space, where the transmission of the blue channel spans the haze-lines.

Scene Recovery: Once $t_B$ is estimated, we may compensate for the color attenuation using the following:

$$J_c = A_c + \frac{I_c - A_c}{e^{-\beta_c z}} = A_c + \frac{I_c - A_c}{t_B^{\frac{\beta_c}{\beta_B}}} \quad \text{Eq. (24)}$$

where $c \in \{R, G, B\}$.

Eq. (24) compensates for the intensity changes that happen in the path between the object and the camera. In addition, the ambient illumination is attenuated by the water column from the surface to the imaging depth, resulting in a colored (bluish) global illumination. We are interested in restoring the colors as when they were viewed under white light. Since this effect is global in the scene, we correct it by performing a global white balance on the result. This global white balance works well only because the distance-dependent attenuation and scattering effects have already been compensated for. Otherwise, as demonstrated in FIG. 14, it has little effect. That is, the contrast in the image may not be uniform and further objects may have a reduced contrast.

Finally, since Eq. (17) applies to the linear captured data, we convert the linear image to sRGB using a standard image processing pipeline, including color-space conversion from the sensor-specific to a standard sRGB, and a gamma curve as in Sumner, R.: Processing raw images in matlab. hdps://users.soe.ucsc.edu/rcsumner/rawguide/RAWguide.pdf (2014), last viewed Apr. 4, 2016.

We have shown that accounting for color-dependent attenuation requires only two additional global parameters. Next we show how to estimate them automatically.

Using the wrong coefficients results in reconstructions that are color skewed. We use this insight to search for the most appropriate water type. We perform the restoration multiple times using different attenuation coefficients corresponding to different water types, and choose the best result automatically based on a variant of the gray world assumption.

FIG. 11 (right) shows the approximate attenuation coefficient ratios $\beta_{BG}, \beta_{BR}$, calculated for different Jerlov water types (FIG. 11a). For each color channel, we take the attenuation at the peak wavelength of typical camera sensitivity responses based on Jiang et al. (2011), Id.: 475 nm, 525 nm and 600 nm for B, G, R, respectively. These values are a mere approximation, since they are based on a single wavelength, while cameras have a wideband response. However, our analysis shows this camera-independent approximation works well in practice: taking into account a wideband response did not yield a noticeable difference in the restoration.

According to the Gray-World assumption of Lu, H., Li, Y., Serikawa, S., Underwater image enhancement using guided trigonometric bilateral filter and fast automatic color correction. In: *Image Processing (ICIP)*, 2013 20th IEEE International Conference on. (September 2013) 3412-3416, the average reflectance of surfaces in the world is achromatic. It has been used in the past for estimating attenuation coefficients underwater using known distances, such as by Bryson, M., Johnson-Roberson, M., Pizarro, O., Williams, S. B.: Colour-consistent structure-from-motion models using underwater imagery. In: *Robotics: Science and Systems*, Citeseer (2012) 1-8. A significant portion of images taken under water often contains water without any objects. The Gray-World assumption obviously does not hold there. Therefore, we apply the Gray-World assumption only at image regions that contain objects, i.e., those that were not identified as veiling-light pixels. Thus, among all results for different water types, we choose the image where the difference between the average values of the red, green, and blue channels is the smallest.

We considered several other measures such as maximal contrast (such as in Tan (2008)), Gray-World assumption on all three color channels and the maximal eigen-value of the RGB-histogram (looking for a similar color distribution among channels). We found that a simple Gray world assumption on non-veiling pixels gave the best results and therefore we focus on this measure.

The present restoration technique is summarized in Algorithm 3 below.

---

Algorithm 3: Underwater image restoration.

Input: I(x), Â
Output: Ĵ(x), t̂(x)
1:  for each ($\beta_{BR}$, $\beta_{BG}$) values of water types (FIG. 10 right) do
2:    for each c ∈ {R, G, B} do Algorithm 3: Underwater image restoration.

3:   $\tilde{I}_c(x) = \text{sign}(I_c(x) - A_c) \cdot \text{abs}(I_c(x) - A_c)^{\beta_{Bc}}$
     (see definition of $\beta_{Bc}$ in Eq. (22))
4:   Convert $\tilde{I}_c$ to spherical coordinates to obtain $[r(x), \phi(x), \theta(x)]$
5:   Cluster the pixels according to $[\phi(x), \theta(x)]$
     Each cluster H is a haze-line.
6:   for each cluster H do
7:     Estimate maximum radius: $\hat{r}_{max}(x) = \max_{x \in H}\{r(x)\}$
8:   for each pixel x do
9:     Estimate transmission: $\tilde{t}_B(x) = \dfrac{r(x)}{\hat{r}_{max}}$
10:  Perform regularization by calculating $\hat{t}(x)$ that minimizes Eq. (15)
11:  Calculate the restored image using Eq. (24)
12:  Perform a global WB on the restored image
13:  Calculate the mean colors of non-veiling-light pixels
14:  Return the image with the mean colors closest to gray Optionally, we choose and return the image that best conforms to the Gray-World assumption, on non-veiling-light pixels. Optionally, other methods for computing a a parameter using the image data, and choosing one of the images based on the parameter. For example, parameters may be standard deviations of one or more color channel values, other statistical values of the RGB color values, and/or the like.

Experimental Results of the Underwater Image Restoration Technique

We first discuss implementation details of the underwater haze-lines variation. According to Eq. (23), we expect to find haze-lines in the medium-compensated space:

$$[(I_R(x) - A_R)^{\beta_{BR}}, (I_G(x) - A_G)^{\beta_{BG}}, (I_B(x) - A_B)] \quad \text{Eq. (25)}$$

The ratios denoted $\beta_{BR}$ and $\beta_{BG}$ are often fractions, and the ambient light denoted A may be larger than the acquired color I. In order to avoid numerical problems, we calculate the colors in the medium-compensated space as follows:

$$\begin{bmatrix} \text{sign}(I_R(x) - A_R) \cdot \text{abs}(I_R(x) - A_R)^{\beta_{BR}} \\ \text{sign}(I_G(x) - A_G) \cdot \text{abs}(I_G(x) - A_G)^{\beta_{BG}} \\ (I_B(x) - A_B) \end{bmatrix} \quad \text{Eq. (26)}$$

We then cluster the points in the medium-compensated space into haze-lines. Due to the smaller variety of colors in the underwater environment, which stems partially from the narrower spectrum of illumination, we use only 500 points sampled uniformly on a sphere, in contrast to the 1000 sampled points in the experiments of the dehazing techniques discussed above.

Once the haze-lines are obtained, we calculate the transmission of each pixel according to the ratio between its distance to the veiling-light and the distance of the most distant pixel in that haze-line. While in air it is somewhat reasonable to assume there is an almost haze-free pixel in each haze-line, under water this assumption does not hold. Even scene points that are located at a distance of one meter from the camera have a transmission of about 0.9 in the blue channel, depending on water type. Therefore, we multiply the initial transmission estimation by 0.9 even before the regularization.

We found the underwater data to be noisier then haze images. Therefore, we set $$\frac{1}{\sigma(x^2)}$$

in the regularization term to be 1 when the haze line has more than 50 pixels and when the radius of the pixels at i is larger than 0.1.

We used raw images taken with a Canon 5DII and a Nikon D810 in three different locations, in tropical waters and in murkier coastal water. Two different color charts were placed in the scenes for verification: one, based on the X-rite color checker (by X-Rite Inc., Michigan, USA), and the second is QPcard-202 (by QPcard AB, Sweden), both encased for water protection, with matte coating.

The color charts are used only for validation. During the transmission estimation, we masked out the color charts, in order to estimate the transmission based on natural scene objects alone. The transmission of those pixels is determined during the regularization step based on neighboring values.

Figure 13A:
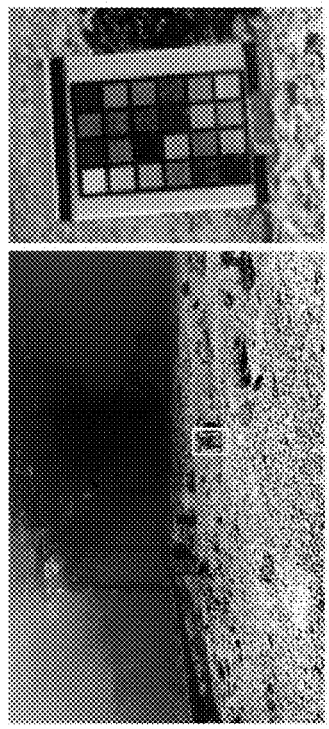
Figure 13A:
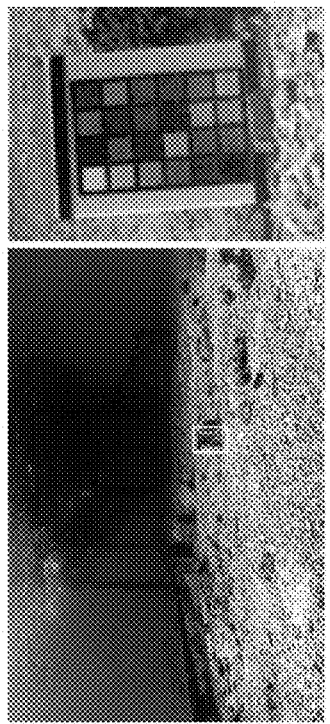
Figure 13A:
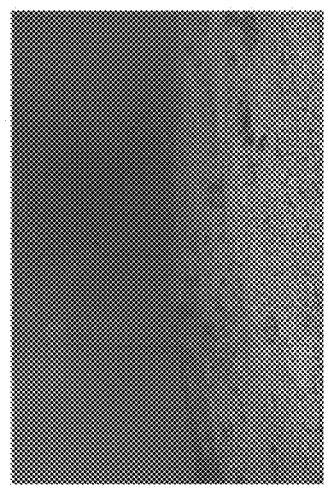

FIG. 13 demonstrates the importance of choosing the correct water type. Using an incorrect value leads to an incorrect transmission estimation. As a result, some area in the image may be under- or over-compensated in the restoration process. FIG. 13a shows an input image with X-rite color checker, and two different outputs (FIGS. 13b and 13c) for two water types, including a zoom-in on the color-checker. The color-checker is used only for validation of the restoration. Direct comparison of color-checker values requires that both images are captured under the same global illumination conditions. Since the global illumination in our case is unknown, we measure the angle $\theta$ in RGB space between the color of the gray-level patches in our result and the direction of a vector with equal color components [1,1,1]. In a perfect restoration $\theta=0$ and $\cos(\theta)=1$. The correct water-type achieves a value of $\cos(\theta)=0.99$ while the incorrect achieves a value of $\cos(\theta)=0.96$.

In FIG. 13a, an image is restored using two different water types (different $\beta_{BR}, \beta_{BG}$ values), shown in FIGS. 13b and 13c, respectively. Using incorrect water type leads to incorrect colors of the restored image, as shown both qualitatively and quantitatively by the zoom-in on the color chart marked by a yellow rectangle. Qualitatively: the rightmost chart shows a pink hue. Quantitatively: We measured the angles in RGB space between the gray level patches and the gray direction [1,1,1] (one angle per patch). The median angle of the patches is presented bellow the color charts ($\cos(\theta)=1$ is a perfect restoration). The correct values indicate water type 3 (coastal waters), while the incorrect values are for open ocean waters.

TABLE 6

Each color chart has six or seven gray level patches. We sample the average value of each patch and calculate the cosine of angles between the patch color and the vector [1, 1, 1]. The median result is presented in the table. An ideal restoration would yield 1.

| Method | Frames (FIG. 14) | | Pier (FIG. 14) | | Rocks (FIG. 15) | |
| --- | --- | --- | --- | --- | --- | --- |
|  | Mac-beth | QPcard-202 | Mac-beth | QPcard-202 | Mac-beth | QPcard-202 |
| Haze-Lines | 0.806 | 0.806 | 0.920 | 0.947 | 0.997 | 0.984 |
| UDCP | 0.724 | 0.788 | 0.577 | 0.782 | 0.946 | 0.815 |
| WCID | 0.782 | 0.805 | 0.715 | 0.952 | 0.930 | 0.807 |
| The present technique | 0.980 | 0.981 | 0.923 | 0.959 | 0.999 | 0.997 |

We present comparative results of our technique against the following single underwater image restoration methods, which are all based on a dark channel prior: a naive white-balance and contrast stretching, UDCP (Drews, P., Nascimento, E., Moraes, F., Botelho, S., Campos, M.: Transmission estimation in underwater single images. In: *Proc. IEEE ICCV Underwater Vision Workshop.* (2013) 825-830), WCID (Chiang, J. Y., Chen, Y. C.: Underwater image enhancement by wavelength compensation and dehazing. *IEEE Trans. Image Processing* 21(4) (2012) 1756-1769) and the present restoration technique. In addition, we include the result of the present dehazing technique (denoted Haze-Lines) as a baseline.

Figure 14:
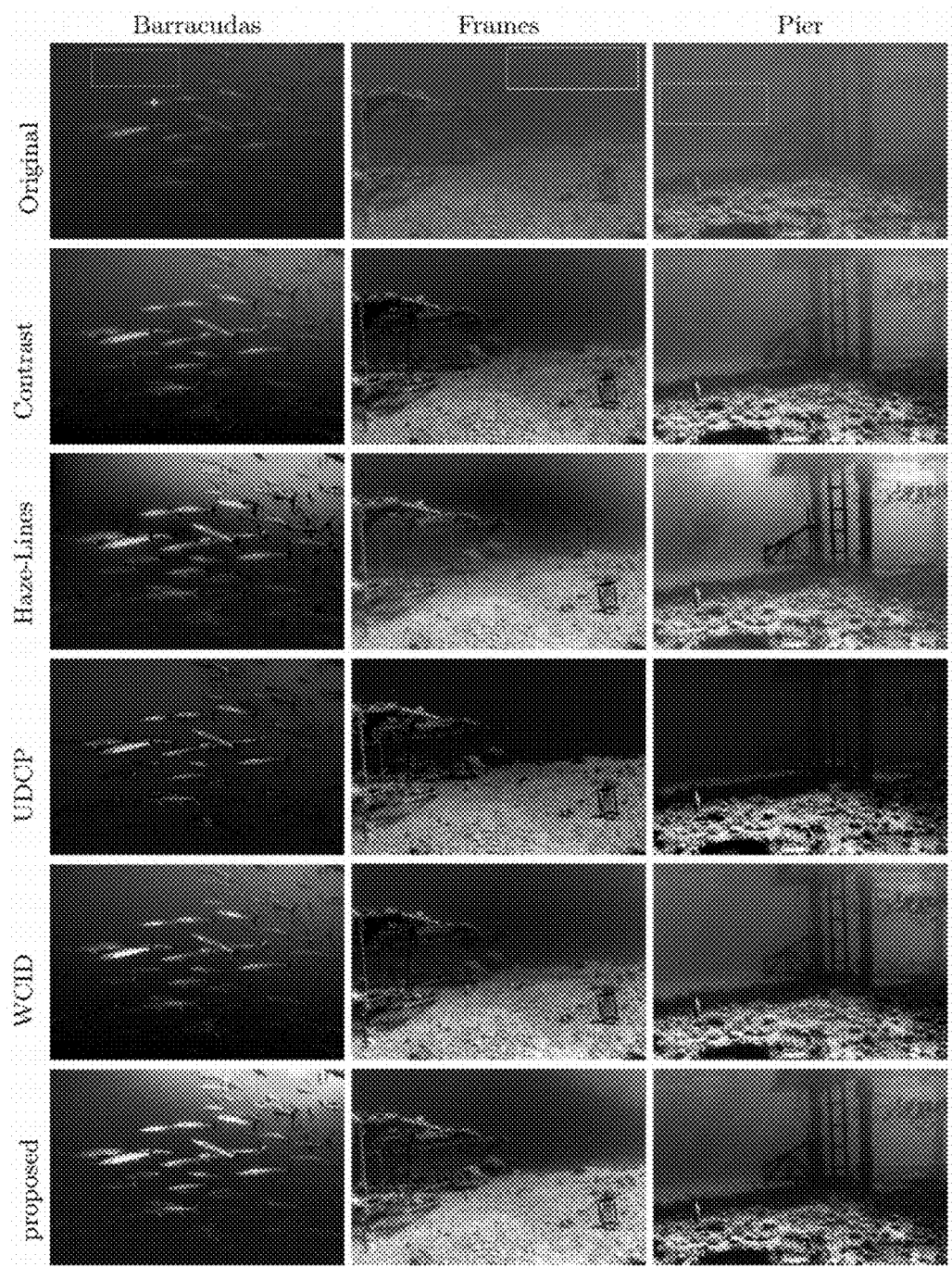
FIG. 14 shows a comparison of the present restoration technique and previous methods, on natural images.

Each of these two paper suggests a different method for choosing the veiling-light: in WCID it is chosen as the brightest pixel value among all local minima in a small neighborhood, while in UDCP it is estimated by finding the brightest pixel in the underwater dark channel $I_{dark}^{UDCP}(x)$ $=\min_{y\in\Omega(x)}[\min_{c\in\{G,B\}}(I_c(y))]$. We manually extract A by averaging a patch in the image, since we find the suggested methods often find bright sand pixels as the veiling-light. The top row of FIG. 14 shows the pixel chosen as veiling-light by WCID marked by a red cross, the one chosen by UDCP marked by an orange plus, and the rectangle chosen manually marked in yellow. Using the same veiling-light value for all methods resulted in artifacts, hence we show the best result for each method, with different veiling-light values (the values are given in the supplementary material).

FIG. 14 compares prominent single underwater image restoration methods. Applying a nave contrast enhancement is not enough, since the contrast degradation caused by the medium is spatially non-uniform. This is evident in the left column, where the farther Barracudas are almost indistinguishable from the background, and in the middle column (Frames), where the structure in the back is hardly noticeable.

In FIG. 14, The top row shows the original input to the restoration methods, with veiling-light estimation: using UDCP in orange, using WCID in red and averaging over a patch in yellow for Haze-lines and the proposed method. The rest of the rows, from top to bottom, show the output of a global contrast enhancement of each channel (which affects the white-balance), Haze-lines, UDCP, WCID, and the present restoration technique.

The methods Haze-Lines, UDCP, and WCID do not restore the color of the sand in the foreground of Frames and Pier correctly, as some areas have a blue-green color-cast while others do not. This phenomenon is an indication of an incorrect wavelength-dependent correction, not a global white balance problem. The red color is attenuated much more than the blue and green, and is not amplified enough by these methods. The present restoration technique is able to compensate for the distance-dependent attenuation. For example, the Barracudas all have similar colors in the output image, regardless of their original distance. Similarly, the sand in the foreground of Frames has a uniform color.

In addition to the qualitative comparison of the images, we used color charts as a quantitative measure. The scenes Frames, Pier and Rocks contain two different color charts, at two different distances from camera, in order to validate the quality of the restoration. The median angle between the gray-level patches and the direction [1,1,1] are summarized in table 6. The present restoration technique out-performs the other methods.

Figure 15:
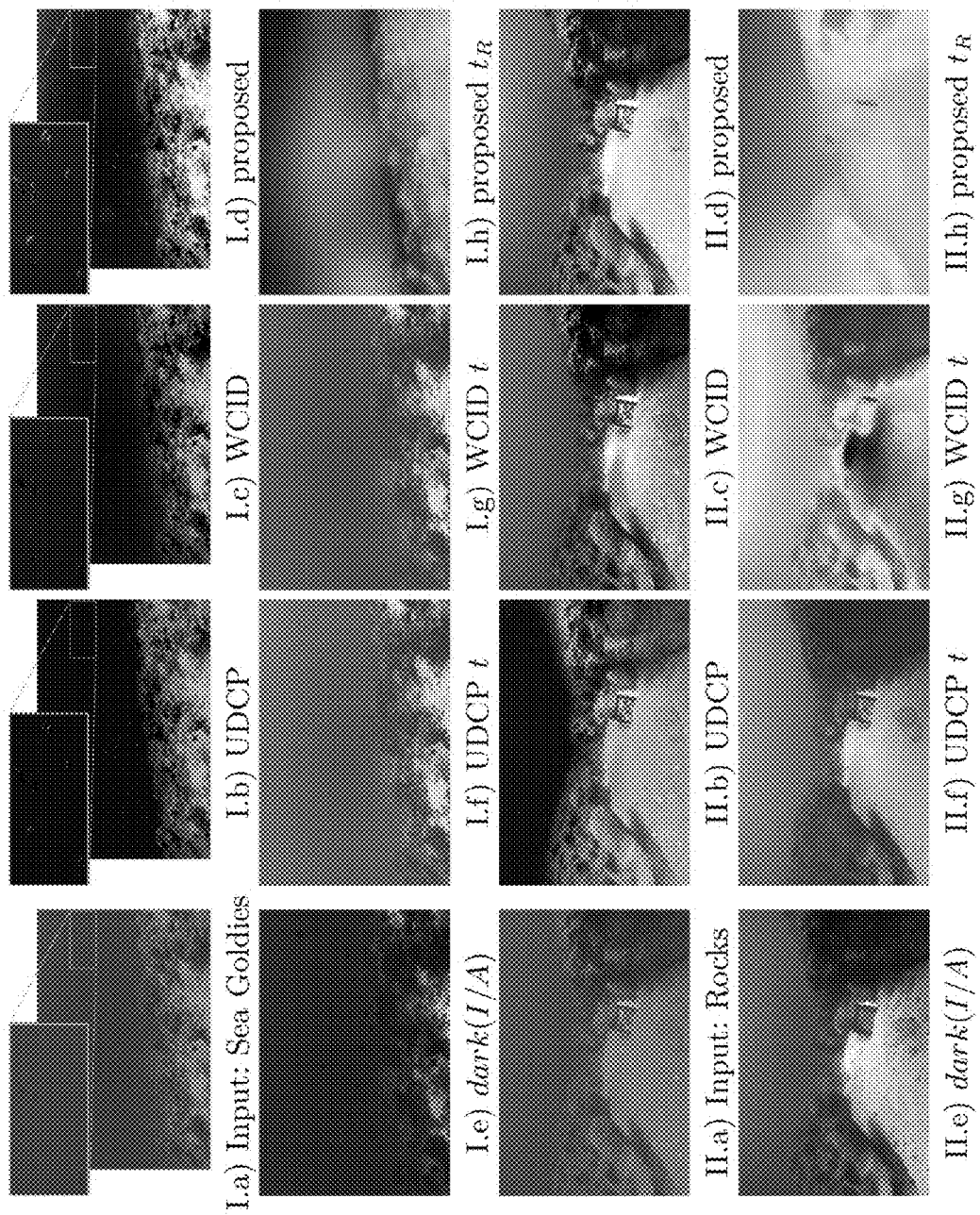
FIG. 15. shows a comparison of the transmission maps of the present restoration technique and previous methods.
Figure 16D:
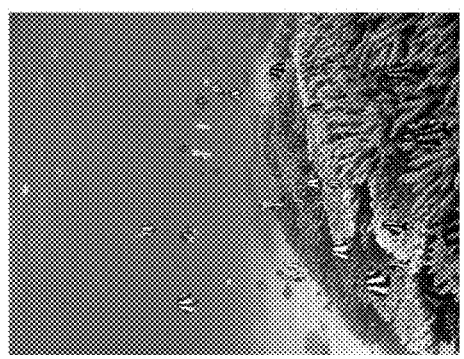
FIGS. 16a-16d show a comparison of the present restoration technique and previous methods, on a JPEG-compressed input image.
Figure 16C:
Figure 16B:
Figure 16A:

FIG. 15 shows an image along with the transmission maps estimated in the process for three methods: UDCP, WCID, and the present restoration technique. Due to the unconstrained nature of the problem, a prior must be used to estimate the transmission. Both UDCP and WCID are based on the dark channel prior, and estimate the transmission according to:

$$\tilde{t}_R(x) = \left(1 - \omega - \min_c\left[\min_{y\in\Omega(x)}\left(\frac{I_c(y)}{A_c}\right)\right]\right), \quad \text{Eq. (27)}$$

where in WCID the outer minimization is carried over $c\in\{R,G,B\}$, and in UDCP over $c\in\{G,B\}$.

FIGS. 15I.a to 15II.e show the value of the dark channel $$\min_{c\in\{R,G,B\}}\left[\min_{y\in\Omega(x)}\left(\frac{I_c(y)}{A_c}\right)\right]$$

per pixel x. In these particular cases, the dark channel assumption does not hold. The top of the scenes has no objects, and therefore their transmission should tend to zero. However, they are relatively dark and according to the prior contain no haze. The bright sand in the foreground has a significant value in all color channels, and therefore is estimated to contain veiling-light by the prior. In contrast, the non-local prior is able to distinguish the foreground sand from the background. The results shown in FIGS. 15I.b, 15I.c, 15II.b, and 15II.c are not restored properly due to the wrong estimation of the transmission. The prior of the present restoration technique produces better results (FIG. 5*d*). For example, FIG. 15I.d shows that the color of the Sea Goldies fish is restored much better than the other methods.

FIG. 15I.a shows the input image. FIGS. 15I.a thru 15I.d show the output of three restoration methods: UDCP, WCID, and the present restoration technique. FIG. 15I.e shows a step in the transmission calculation using the dark channel prior:

$$\min_{c\in\{R,G,B\}}\left[\min_{y\in\Omega(x)}\left(\frac{I_c}{A_c}\right)\right].$$

FIGS. 15I.f thru 15I.h show the transmission maps estimated during the restoration process, corresponding to FIGS. 15I.b thru 15I.d, color-mapped such that warm colors indicate a high transmission, and cold colors indicate a low transmission. For the present restoration technique, we show the transmission of the red channel.

FIG. 16 compares our result to methods proposed in Carlevaris-Bianco, N., Mohan, A., Eustice, R. M.: Initial results in underwater single image dehazing. In: *IEEE OCEANS.* (2010) 1-8; and Peng, Y. T., Zhao, X., Cosman, P. C.: Single underwater image enhancement using depth estimation based on blurriness. In: *Image Processing (ICIP), 2015 IEEE International Conference on.* (2015) 4952-4956. We did not have the raw files from these two papers, so we used the processed image as input to our technique. JPEG compression artifacts are amplified by the restoration method, however the present restoration technique removes the blue hue completely from the farther corals, unlike previously proposed methods. In this figure, 16*a* is the input image, 16*b-d* show the output of three restoration methods: Carlevaris-Bianco et al. (2010), Id., Peng et al. (2015), Id., and the present restoration technique, respectively.

The present invention may be a system, a method, and/or a computer program product. The computer program product may include a computer readable storage medium (or media) having computer readable program instructions thereon for causing a hardware processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein may be downloaded to respective computing/processing devices (which comprise hardware processor) from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, a hardware processor that is, for example, a microprocessor, programmable logic circuitry, a field-programmable gate array (FPGA), or programmable logic arrays (PLA), may execute the computer readable program instructions by utilizing state information of the computer readable program instructions to personalize the hardware processor, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, may be implemented by computer readable program instructions.

These specialized computer readable program instructions may be provided to a microprocessor of a general-purpose computer, special purpose computer, or other programmable data processing apparatus to produce a machine, such that the instructions, which execute via the microprocessor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for dehazing a digital image, comprising: operating at least one hardware processor to:
cluster pixels of a digital image into haze-lines, wherein each of the haze-lines is comprised of a sub-group of the pixels that are scattered non-locally over the digital image;
estimate, based on the haze-lines, a transmission map of the digital image, wherein the transmission map encodes scene depth information for each pixel of the digital image; and
calculate a dehazed digital image based on the transmission map;
wherein said clustering comprises:
representing colors of the pixels of the digital image in a spherical coordinate system whose origin is an estimated global airlight value,
uniformly sampling the unit sphere of the representation, to output a plurality of color samples each associated with one of the pixels of the digital image, and
grouping the color samples based on their θ (Theta) and φ (Phi) angles in the spherical coordinate system, according to a mutual closest point on the unit sphere, thereby producing multiple groups each being one of the haze-lines.

2. The method according to claim 1, wherein the clustering of pixels comprises:
representing color differences between the pixels of the digital image and the airlight value on a pre-computed tessellation of the unit sphere, where the pre-computed tessellation is uniformly sampled and stored in Cartesian coordinates in a KD-tree;
searching for nearest neighbors on the KD-tree using Euclidean distance coordinates;
grouping the color samples based on the nearest neighbors, thereby producing multiple groups each being one of the haze-lines.

3. The method according to claim 1, wherein the estimating of the transmission map comprises:
estimating an initial transmission map as the quotient, for each individual pixel of the pixels of the digital image, of:
(a) a distance of the individual pixel from an airlight value, and
(b) a distance from a pixel which is farthest away from the airlight value and belongs to the same haze-line as the individual pixel; and
regularizing the initial transmission map by enforcing a smoothness of the digital image on the initial transmission.

4. A system comprising:
an image sensor configured to acquire a digital image;
a non-transitory computer-readable storage medium having stored thereon program instructions to:
cluster pixels of the digital image into haze-lines, wherein each of the haze-lines is comprised of a sub-group of the pixels that are scattered non-locally over the digital image,
estimate, based on the haze-lines, a transmission map of the digital image, wherein the transmission map encodes scene depth information for each pixel of the digital image, and
calculate a dehazed digital image based on the transmission map; and
at least one hardware processor configured to execute the program instructions wherein the clustering comprises:
representing colors of the pixels of the digital image in a spherical coordinate system whose origin is an estimated global airlight value,
uniformly sampling the unit sphere of the representation, to output a plurality of color samples each associated with one of the pixels of the digital image, and
grouping the color samples based on their θ (Theta) and φ (Phi) angles in the spherical coordinate system, according to a mutual closest point on the unit sphere, thereby producing multiple groups each being one of the haze-lines.

5. The system according to claim 4, wherein the clustering of pixels comprises:
representing the color differences between the pixels of the digital image and the airlight value on a pre-computed tessellation of the unit sphere, where the pre-computed tessellation is uniformly sampled and stored in Cartesian coordinates in a KD-tree;
searching for nearest neighbors on the KD-tree using Euclidean distance coordinates;
grouping the color samples based on the nearest neighbors, thereby producing multiple groups each being one of the haze-lines.

6. The system according to claim 4, wherein the estimating of the transmission map comprises:
estimating an initial transmission map as the quotient, for each individual pixel of the pixels of the digital image, of:
(a) a distance of the individual pixel from an airlight value, and
(b) a distance from a pixel which is farthest away from the airlight value and belongs to the same haze-line as the individual pixel; and
regularizing the initial transmission map by enforcing a smoothness of the digital image on the initial transmission.

7. A computer program product for dehazing a digital image, the computer program product comprising a non-transitory computer-readable storage medium having program code embodied therewith, the program code executable by at least one hardware processor to:
cluster pixels of a digital image into haze-lines, wherein each of the haze-lines is comprised of a sub-group of the pixels that are scattered non-locally over the digital image;
estimate, based on the haze-lines, a transmission map of the digital image, wherein the transmission map encodes scene depth information for each pixel of the digital image; and
calculate a dehazed digital image based on the transmission map
wherein the clustering comprises:
representing colors of the pixels of the digital image in a spherical coordinate system whose origin is an estimated global airlight value, uniformly sampling the unit sphere of the representation, to output a plurality of color samples each associated with one of the pixels of the digital image, and grouping the color samples based on their θ (Theta) and φ (Phi) angles in the spherical coordinate system, according to a mutual closest point on the unit sphere, thereby producing multiple groups each being one of the haze-lines.

8. The computer program product according to claim 7, wherein the clustering of pixels comprises:

representing the color differences between the pixels of the digital image and the airlight value on a pre-computed tessellation of the unit sphere, where the pre-computed tessellation is uniformly sampled and stored in Cartesian coordinates in a KD-tree;

searching for nearest neighbors on the KD-tree using Euclidean distance coordinates;

grouping the color samples based on the nearest neighbors, thereby producing multiple groups each being one of the haze-lines.

9. The computer program product according to claim 7, wherein the estimating of the transmission map comprises:

estimating an initial transmission map as the quotient, for each individual pixel of the pixels of the digital image, of:

(a) a distance of the individual pixel from an airlight value, and (b) a distance from a pixel which is farthest away from the airlight value and belongs to the same haze-line as the individual pixel; and regularizing the initial transmission map by enforcing a smoothness of the digital image on the initial transmission.

10. The method according to claim 1, further comprising, prior to the clustering of pixels:

converting the digital image to one or more medium-compensated images that are each based on attenuation coefficient ratios of a different water type, wherein the digital image is of an underwater scene; and performing the clustering, the estimating, and the calculating for each of the one or more medium-compensated images.

11. The method according to claim 10, further comprising computing the estimated global veiling-light value by:

generating an edge map of each of the plurality of medium-compensated images;

thresholding the edge map, to produce multiple pixel blobs; and determining that a color or an average color of pixels making up a largest one of the multiple pixel blobs, is the global veiling-light value.

12. The method according to claim 10, further comprising:

for each of the dehazed digital images:

performing global white balancing of the restored digital image, to output a white-balanced image, calculating a mean color of non-veiling-light pixels; and outputting the white-balanced image having the closest mean color to gray.

13. The system according to claim 4, wherein the program instructions are further to:

prior to the clustering of pixels:

converting the digital image to one or more medium-compensated images that are each based on attenuation coefficient ratios of a different water type, wherein the digital image is of an underwater scene; and performing the clustering, the estimating, and the calculating for each of the one or more medium-compensated images.

14. The system according to claim 13, wherein the program instructions are further to compute the estimated global veiling-light value by:

generating an edge map of each of the plurality of medium-compensated images;

thresholding the edge map, to produce multiple pixel blobs; and determining that a color or an average color of pixels making up a largest one of the multiple pixel blobs, is the global veiling-light value.

15. The system according to claim 13, wherein the program instructions are further to:

for each of the dehazed digital images:

perform global white balancing of the restored digital image, to output a white-balanced image, calculate a mean color of non-veiling-light pixels; and output the white-balanced image having the closest mean color to gray.

16. The computer program product according to claim 7, wherein the program code is further executable to:

prior to the clustering of pixels:

convert the digital image to one or more medium-compensated images that are each based on attenuation coefficient ratios of a different water type, wherein the digital image is of an underwater scene; and perform the clustering, the estimating, and the calculating for each of the one or more medium-compensated images.

17. The computer program product according to claim 16, wherein the program code is further executable to compute the estimated global veiling-light value by:

generating an edge map of each of the plurality of medium-compensated images;

thresholding the edge map, to produce multiple pixel blobs; and determining that a color or an average color of pixels making up a largest one of the multiple pixel blobs, is the global veiling-light value.

18. The computer program product according to claim 16, wherein the program code is further executable to:

for each of the dehazed digital images:

perform global white balancing of the restored digital image, to output a white-balanced image, calculate a mean color of non-veiling-light pixels; and output the white-balanced image having the closest mean color to gray.

* * * * *